(12) United States Patent
Freerksen

(10) Patent No.: US 12,287,194 B2
(45) Date of Patent: Apr. 29, 2025

(54) MOTION MECHANISM FOR MEASURING PROBE

(71) Applicant: Mitutoyo Corporation, Kanagawa-ken (JP)

(72) Inventor: Isaiah Freerksen, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 366 days.

(21) Appl. No.: 18/059,851

(22) Filed: Nov. 29, 2022

(65) Prior Publication Data

US 2024/0175668 A1  May 30, 2024

(51) Int. Cl.
*G01B 5/012* (2006.01)
(52) U.S. Cl.
CPC .................................. *G01B 5/012* (2013.01)
(58) Field of Classification Search
CPC ........ G01B 5/012; G01B 3/008; G01B 7/016; G01B 21/00; G01B 21/20
See application file for complete search history.

(56) References Cited

U.S. PATENT DOCUMENTS

| 4,136,458 A | 1/1979 | Bell et al. |
| 4,153,998 A | 5/1979 | McMurtry |
| 4,177,568 A | 12/1979 | Werner et al. |
| 4,270,275 A | 6/1981 | McMurtry |
| 5,253,428 A | 10/1993 | McMurtry |
| 5,345,690 A | 9/1994 | McMurty et al. |
| 5,353,514 A | 10/1994 | McMurtry |
| 5,491,904 A | 2/1996 | McMurtry |
| 5,669,151 A | 9/1997 | Collingwood |
| 5,671,542 A | 9/1997 | Zannis et al. |
| 5,755,038 A | 5/1998 | McMurtry |

(Continued)

FOREIGN PATENT DOCUMENTS

| DE | 2013639 B1 | 5/1971 |
| EP | 3748282 A1 | 12/2020 |

(Continued)

OTHER PUBLICATIONS

Renishaw, "Innovations in touch-trigger probe sensor technology," White paper, Issue 1 2003. (8 pages).

(Continued)

*Primary Examiner* — Yaritza Guadalupe-Mccall
(74) *Attorney, Agent, or Firm* — Seed IP Law Group LLP

(57) ABSTRACT

A measuring probe includes a stylus having one or more contact portions; a detection element configured to detect a movement of the stylus based on a contact made by the contact portions; a signal processing portion configured to process a signal from the detection element to output a measurement signal; and a stylus motion mechanism. The stylus motion mechanism includes a first motion portion configured to enable motion of the stylus from a rest position in a positive axial direction when a corresponding force in the positive axial direction is applied by a contact of a contact portion of the stylus with a workpiece; and a second motion portion configured to enable motion of the stylus from the rest position in a negative axial direction opposite to the positive axial direction when a corresponding force is applied by a contact of a contact portion of the stylus with a workpiece.

25 Claims, 14 Drawing Sheets

(56) References Cited

U.S. PATENT DOCUMENTS

| | | |
|---|---|---|
| 6,472,981 B2 | 10/2002 | Fuge et al. |
| 6,776,344 B2 | 8/2004 | Daniel et al. |
| 6,839,563 B1 | 1/2005 | Kirby et al. |
| 6,860,026 B2 | 3/2005 | Fuge |
| 6,941,671 B2 | 9/2005 | Fuge |
| 6,971,183 B2 * | 12/2005 | Brenner ................. G01B 5/012 33/503 |
| 7,145,468 B2 | 12/2006 | Collingwood et al. |
| 7,285,935 B2 | 10/2007 | Fuge |
| 7,316,077 B2 | 1/2008 | Fuge et al. |
| 7,441,707 B2 | 10/2008 | Daniel et al. |
| 7,486,195 B2 | 2/2009 | Collingwood et al. |
| 7,603,789 B2 | 10/2009 | Hellier et al. |
| 7,665,219 B2 | 2/2010 | Styles et al. |
| 7,689,379 B2 | 3/2010 | Fuge et al. |
| 7,792,654 B2 | 9/2010 | Prestidge et al. |
| 7,812,736 B2 | 10/2010 | Collingwood et al. |
| 7,821,420 B2 | 10/2010 | Woollett et al. |
| 8,140,287 B2 | 3/2012 | Prestidge et al. |
| 9,140,547 B2 | 9/2015 | Woollett et al. |
| 9,618,312 B2 * | 4/2017 | Shimaoka ............. G01B 5/012 |
| 10,145,666 B2 | 12/2018 | Jansson |
| 10,184,773 B2 * | 1/2019 | Jansson ................. G01B 5/012 |
| 10,415,949 B2 * | 9/2019 | Koga ..................... G01B 7/001 |
| 10,422,628 B2 * | 9/2019 | Shimaoka ............. G01B 5/012 |
| 10,852,119 B2 * | 12/2020 | Harsila ................. G01B 5/012 |
| 11,047,678 B2 * | 6/2021 | Koga ..................... G01B 21/04 |
| 11,268,874 B2 | 3/2022 | Saito et al. |
| 12,025,637 B2 * | 7/2024 | Tsai .................. G01R 1/07378 |
| 12,174,013 B2 * | 12/2024 | Hamner ................. G01B 5/012 |
| 2009/0130987 A1 | 5/2009 | Daniel et al. |
| 2011/0002361 A1 | 1/2011 | Woollett et al. |
| 2016/0258738 A1 * | 9/2016 | Shimaoka ............ G01B 11/007 |
| 2017/0146336 A1 * | 5/2017 | Shimaoka ............ G01B 11/007 |
| 2024/0077296 A1 * | 3/2024 | Harsila ................. G01B 5/008 |
| 2024/0175668 A1 * | 5/2024 | Freerksen ............. G01B 5/012 |

FOREIGN PATENT DOCUMENTS

| | | |
|---|---|---|
| WO | WO 2004057552 A1 | 7/2004 |
| WO | WO 2007028964 A1 | 3/2007 |

OTHER PUBLICATIONS

Renishaw, "One-touch versus two-touch probing strategies," White paper TE412, 2010. (4 pages).

Renishaw, "Probing systems for CNC machine tools," Technical Paper, 2001. (204 pages).

Slocum, "Kinematic Couplings: A Review of Design Principles and Applications," *International Journal of Machine Tools and Manufacture*, Massachusetts Institute of Technology, 2010. (35 pages).

Extended European Search Report, mailed Mar. 22, 2024, for European Application No. 23212597.1-1001, 11 pages.

* cited by examiner

MOTION MECHANISM FOR MEASURING PROBE

BACKGROUND

Technical Field

This disclosure relates to measuring probes for measuring machines, and more particularly to stylus motion mechanisms for measuring probes.

Description of the Related Art

A measuring probe for a measuring machine (e.g., a coordinate measuring machine (CMM)) is described in U.S. Pat. No. 10,415,949, which is hereby incorporated herein by reference in its entirety. Such a measuring probe includes: a stylus having a contact portion to be in contact with a workpiece to be measured; a probe housing capable of supporting the stylus on an axial center; a stylus motion mechanism for enabling motion of the stylus, a detection element capable of detecting a movement of the contact portion as corresponding to a contact with a workpiece; and a signal processing circuit for processing an output of the detection element. The signal processing circuit processes a sensor signal from the detection element to output a measurement signal (e.g., a touch signal). Another CMM measuring probe with similar components (e.g., and capable of outputting digital measurement signals) is described in U.S. Pat. No. 10,852,119, which is hereby incorporated herein by reference in its entirety.

Systems and configurations that may improve or otherwise enhance such measuring probes (e.g., in relation to improved capabilities and/or characteristics, such as of the stylus motion mechanisms, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with principles as disclosed herein, a measuring system is provided including a measuring probe comprising:

a stylus having one or more contact portions that are configured to contact a workpiece to be measured;
at least one detection element configured to detect a movement of the stylus as corresponding to a contact of a contact portion of the stylus with a workpiece;
a signal processing portion configured to process a generated signal obtained from an output of the at least one detection element to output a measurement signal; and
a stylus motion mechanism, comprising:
  a first motion portion configured to enable motion of the stylus from a rest position in a positive axial direction when a corresponding force in the positive axial direction is applied by a contact of a contact portion of the stylus with a workpiece, wherein the positive axial direction is toward a proximal end of the measuring probe; and
  a second motion portion configured to enable motion of the stylus from the rest position in a negative axial direction when a corresponding force in the negative axial direction is applied by a contact of a contact portion of the stylus with a workpiece, wherein the negative axial direction is opposite to the positive axial direction.

According to another aspect, a method is provided for operating a measuring system including a measuring probe. The method comprises:

utilizing the first motion portion to enable motion of the stylus from a rest position in a positive axial direction when a corresponding force in the positive axial direction is applied by a contact of a contact portion of the stylus with a workpiece, wherein the positive axial direction is toward a proximal end of the measuring probe; and
utilizing the second motion portion to enable motion of the stylus from the rest position in a negative axial direction when a corresponding force in the negative axial direction is applied by a contact of a contact portion of the stylus with a workpiece, wherein the negative axial direction is opposite to the positive axial direction.

According to a further aspect, a stylus motion mechanism is provided for utilization in a measuring probe. The stylus motion mechanism comprises:

a stylus coupling portion that is configured to be rigidly coupled to the stylus;
a first motion portion configured to enable motion of the stylus coupling portion from a rest position in a positive axial direction when a corresponding force in the positive axial direction is applied by a contact of a contact portion of the stylus with a workpiece, wherein the positive axial direction is toward a proximal end of the measuring probe; and
a second motion portion configured to enable motion of the stylus coupling portion from the rest position in a negative axial direction when a corresponding force in the negative axial direction is applied by a contact of a contact portion of the stylus with a workpiece, wherein the negative axial direction is opposite to the positive axial direction.

DETAILED DESCRIPTION

Figure 1:
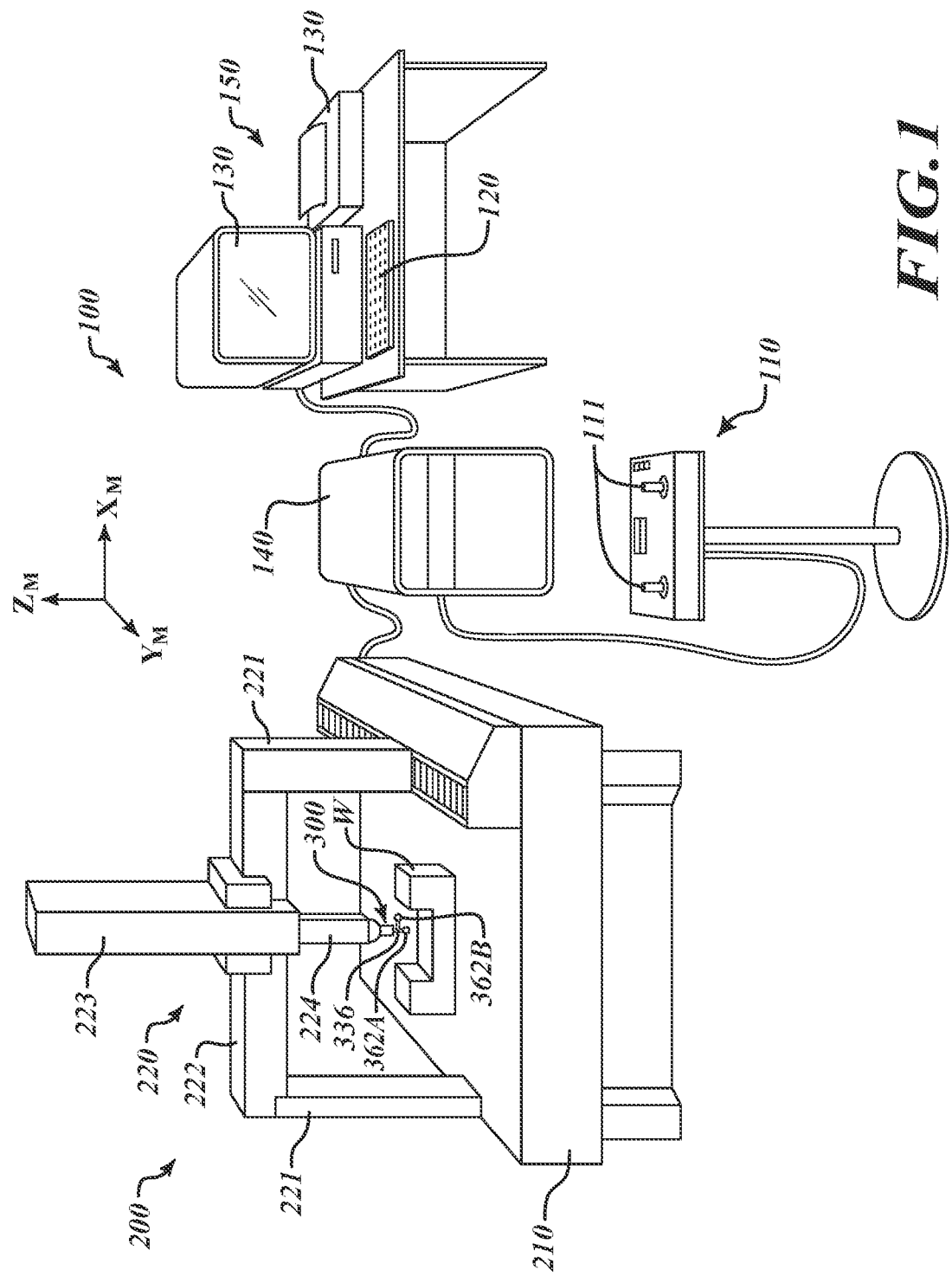
FIG. 1 is a schematic diagram illustrating an example of a measuring system using a measuring probe according to an embodiment of the present invention.

FIG. 1 is a schematic diagram illustrating an example of a measuring system 100 using a measuring probe 300. As illustrated in FIG. 1, the measuring system 100 includes: the measuring probe 300; a measuring machine 200 (e.g., a coordinate measuring machine (CMM), or a computer numerical control (CNC) machine, etc.) configured to move the measuring probe 300; an operation portion 110 having manually-operated joysticks 111; and a system controller portion 140 configured to control certain operations of the measuring machine 200 and the measuring probe 300. The measuring system 100 also includes: a host computer 150 configured to operate the measuring machine 200 via the system controller portion 140 and to process measurement data acquired by the measuring machine 200 to obtain, for example, dimensions or a shape of a workpiece W to be measured; one or more input units 120 (e.g., a keyboard, mouse, etc.) configured to input, for example, measurement conditions; and one or more output units 130 (e.g., a display, printer, etc.) configured to output, for example, measured results. As will be described in more detail below with respect to FIG. 2, the measuring probe 300 includes a stylus 336 having one or more contact portions 362 (e.g., contact portions 362A and 362B) to be in contact with the workpiece W to be measured.

As illustrated in FIG. 1, the measuring machine 200 includes: a surface plate 210; a drive mechanism 220 which is provided to stand on the surface plate 210 and configured to move the measuring probe 300 three-dimensionally; and a drive sensor (not illustrated) configured to detect a drive amount of the drive mechanism 220. The drive mechanism 220 includes X axis, Y axis, and Z axis movement mechanisms 222, 221, and 223 (e.g., slide mechanisms), respectively, for moving the measuring probe 300 three-dimensionally.

In relation to the measuring probe 300, certain previously known measuring probes (e.g., certain touch probes) typically have stylus motion mechanisms that are spring-loaded in one axial direction (e.g., which may be referenced as a positive axial direction, also known as a +Z direction in relation to an XYZ coordinate system of all or part of the measuring probe, stylus motion mechanism and/or measuring machine that moves the measuring probe). Such stylus motion mechanisms are spring loaded for enabling motion of a stylus 336 in the positive axial direction/+Z direction from a rest position to enable the contact portion of the stylus to be pushed into a workpiece (e.g., for measuring the workpiece) without internal damage to the measuring probe. Certain of such previously known measuring probes/stylus motion mechanisms also enable ±X and ±Y motions of the contact portion of the stylus when contacting a workpiece, although typically have not been configured (e.g., spring loaded) for enabling motion and/or sensing touch signals in a negative axial direction/−Z direction. As will be described in more detail below, a measuring probe with a stylus motion mechanism 334 (FIG. 2) is disclosed herein which enables both positive and negative axial motion of a stylus 336 from a rest position (e.g., enabling ±Z motion, in addition to enabling the typical ±X and ±Y motions). The disclosed configuration enables the stylus 336 to be held in a firm position (e.g., a rest position) when the stylus is not in contact with a workpiece. When a measuring machine of a measuring system moves the measuring probe 300 to cause the stylus 336 to contact a workpiece W, the stylus 336 is enabled to move against a flexible force (e.g., a spring force) within the stylus motion mechanism 334 regardless of whether the contact causes the stylus to move in the positive axial direction or the negative axial direction (e.g., +Z or −Z direction).

In various implementations, different measuring systems may utilize different types of measuring machines for moving a measuring probe for measuring/inspecting a workpiece. For example, a coordinate measuring machine (CMM) may be utilized for certain measurement/inspection processes. As another example, a computer numerical control (CNC) machine may be a type of measuring machine that is utilized for moving a measuring probe for measuring/inspecting a workpiece (e.g., for which the CNC machine may also perform processes for manufacturing/machining the workpiece). Certain CNC machines may have relatively less precise motion control than certain CMMs and/or may utilize measuring probes in certain conditions (e.g., with regard to workpieces that are being manufactured/machined by the CNC machine and in relation to certain possible movements of a measuring probe around or within such workpieces for measuring/inspecting workpiece surfaces that may be in different orientations, etc.) In regard to such aspects, it may be particularly desirable in some implementations for a measuring probe to have a robust stylus motion mechanism. For example, a desirable stylus motion mechanism may enable movement for contacting a workpiece (e.g., with a possibility of relatively longer over-travel distances) without internal damage to the measuring probe, and in regard to possible motion of the stylus in both positive and negative axial directions (e.g., depending on the motion of the measuring probe and orientations of the workpiece surfaces that need to be measured/inspected, etc.) The stylus motion mechanism 334 of the measuring probe 300 includes such desirable characteristics, as will be described in more detail below.

Figure 2:
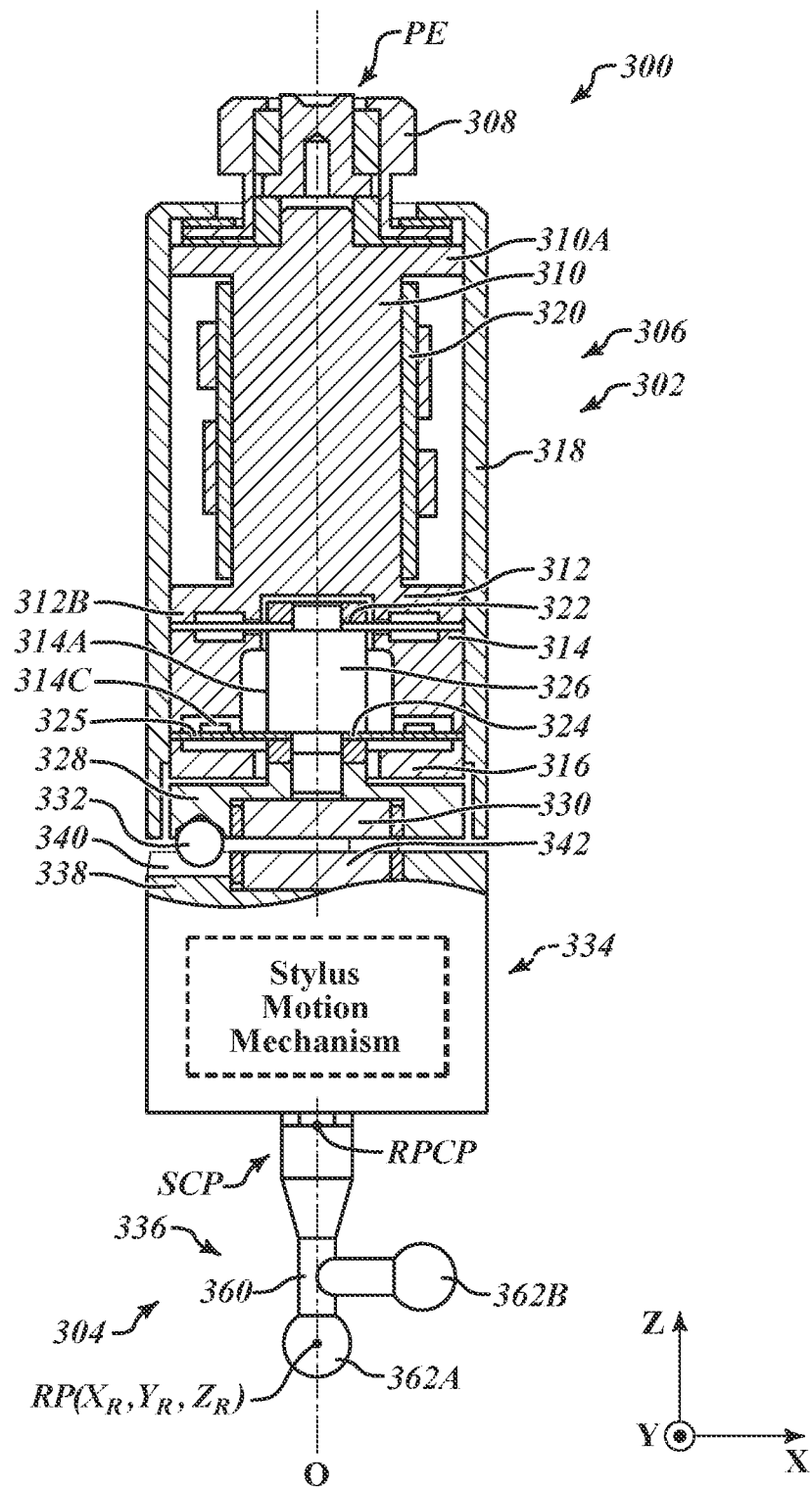
FIG. 2 is a schematic diagram illustrating a cross-section of the measuring probe of FIG. 1.

FIG. 2 is a schematic diagram illustrating a cross-section of the measuring probe 300 of FIG. 1. As illustrated in FIG. 2, the measuring probe 300 includes: the stylus 336 having the contact portions 362A and 362B to be in contact with the workpiece W to be measured; a probe housing 306 configured to be capable of supporting the stylus 336 on an axial center O; one or more (e.g., four in the present embodiment) detection elements 325 configured to be capable of detecting movements of the contact portion 362A deviating from the axial center O and along the axial center O (e.g., also capable of detecting movements of the contact portion 362B in accordance with known spatial relationships between the contact portions 362A and 362B); and a signal processing circuit 320 configured to process outputs of the four detection elements 325 to output a measurement signal Str (e.g., a touch signal), which may be a digital signal. Specifically, the measuring probe 300 is referred to also as a touch signal probe. Note that the stylus 336 is included in a stylus module 304 (i.e., including a stylus motion mechanism 334), and the probe housing 306 and the detection elements 325 are included in a probe main body 302. The probe main body 302 is supported by a spindle 224 of the drive mechanism 220 of the measuring machine 200 (see FIG. 1). The stylus module 304 is detachably coupled to the probe main body 302 with high positional reproducibility via a kinematic joint.

For the purpose of the following description, the longitudinal direction on the plane of paper in FIG. 2 is defined as a Z-direction, the horizontal direction on the plane of paper is defined as an X-direction, and the vertical direction to the plane of paper is defined as a Y-direction. The direction of the axial center O (axial direction O) of the measuring probe 300 therefore coincides with the Z-direction.

As illustrated in FIG. 2, the probe main body 302 includes the probe housing 306, the signal processing circuit 320, supporting members (supporters) 322 and 324, the detection elements 325, a coupling shaft 326, a flange member 328, a permanent magnet 330, and three balls 332. The probe housing 306 includes an attachment portion 308, a circuit placement portion 310, a fixing member 314, a bottom member 316, and a main body cover 318.

As illustrated in FIG. 2, the attachment portion 308 is a portion to be attached to the spindle 224 at the upper end portion of the measuring probe 300. The circuit placement portion 310 is disposed at a lower end of the attachment portion 308. In various implementations, a cross-section of the circuit placement portion 310 perpendicular to the axial center O may have a generally triangular shape except for a disc-shaped upper end portion 310A and a disc-shaped lower flange 312 provided at a lower end of the circuit placement portion 310. The signal processing circuit 320 is disposed on the outer periphery of the generally triangular shape. The circuit placement portion 310 is disposed above the supporting members 322 and 324.

As illustrated in FIG. 2, the fixing member 314 is fixed to a lower end peripheral portion 312B of the lower flange 312 with the supporting member 322 interposed therebetween. The fixing member 314 has a cylindrical shape provided with an opening 314A on the axial center O. A lower end inner surface of the fixing member 314 is provided with four recesses 314C at fourfold symmetry positions. The bottom member 316 is fixed to a lower end peripheral portion of the fixing member 314 with the supporting member 324 interposed therebetween. The bottom member 316 has an annular shape. The main body cover 318 has a cylindrical shape and is disposed around the circuit placement portion 310, the lower flange 312, the fixing member 314, and the bottom member 316 in such a manner as to cover all of the signal processing circuit 320. The main body cover 318 is fixed to the fixing member 314 with bolts.

Figure 3:
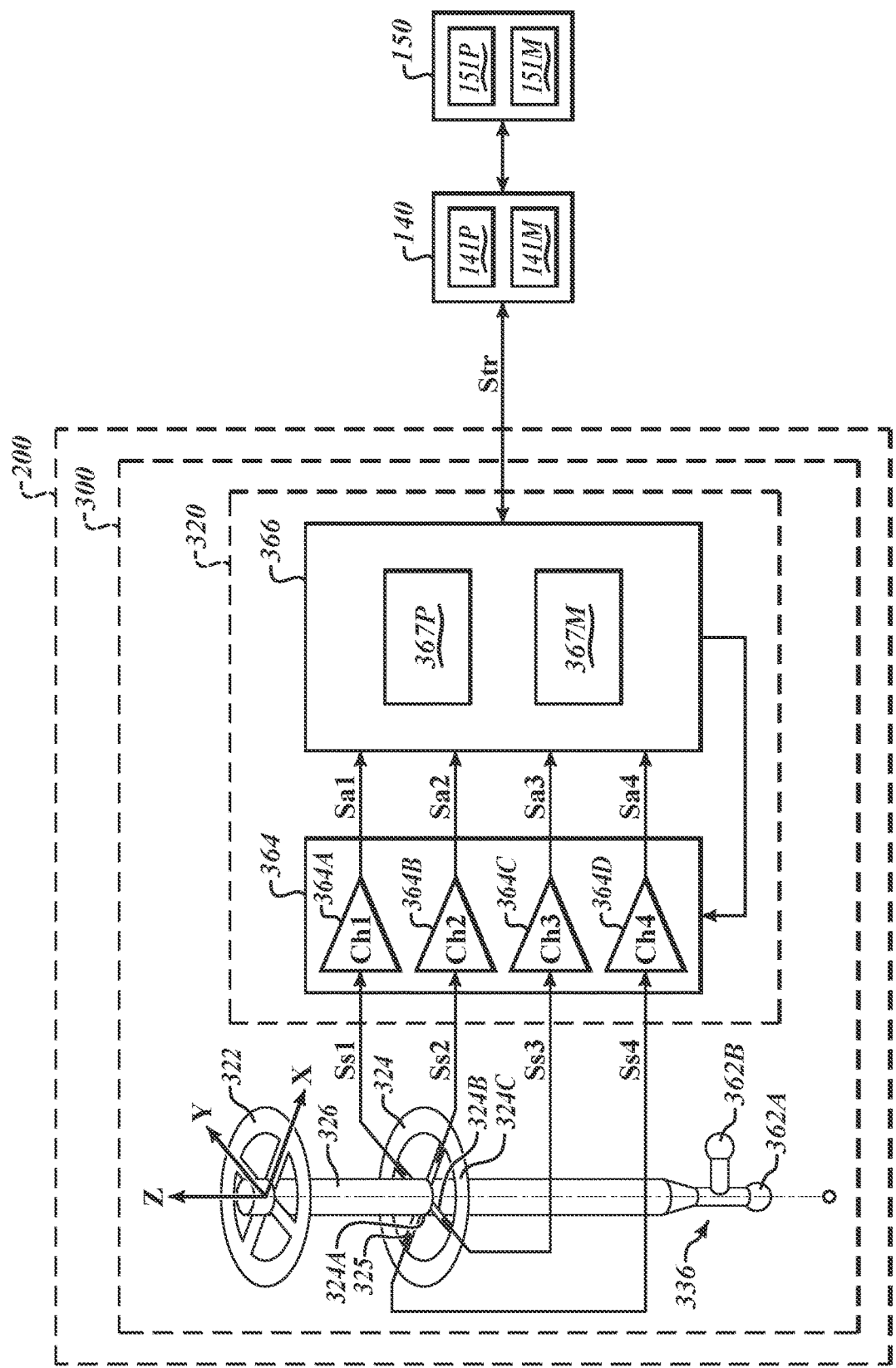
FIG. 3 is a block diagram illustrating certain portions of the measuring system of FIG. 1.

FIG. 3 is a block diagram illustrating certain portions of the measuring system 100 of FIG. 1. As illustrated in FIG. 3, the signal processing circuit 320 is a circuit configured to process outputs of the detection elements 325 to output the measurement signal Str (e.g., touch signal/contact sensing signal for notifying when the contact portion 362A or 362B is in contact with the workpiece W to be measured). The signal processing circuit 320 includes a signal amplifying portion (a signal amplifying circuit) 364 and a signal processing portion 366 (e.g., including a signal processing device).

The signal amplifying portion 364 includes amplifiers 364A to 364D configured to amplify respective sensor signals Ss (Ss1 to Ss4), which are the outputs of the detection elements 325, to output amplified signals Sa (Sa1 to Sa4), respectively. Note that reference signs Ch1 to Ch4 denote channels 1 to 4, respectively. The signal processing portion 366 processes the amplified signals Sa to output the measurement signal Str. That is, the signal amplifying portion 364 configured to amplify the respective outputs of the detection elements 325 is provided before the signal processing portion 366 in the present embodiment, and generated signals Sg (Sg1 to Sg4) are the amplified signals Sa of the signal amplifying portion 364.

The signal processing portion 366 is configured to process the generated signals Sg obtained from the outputs of the four detection elements 325 so as to output the measurement signal Str. The signal processing portion 366 is configured to obtain/determine movement/deflection amounts in the three X-, Y-, and Z-directions from the generated signals Sg (Sg1 to Sg4), synthesize the movement/deflection amounts in the three directions, and output the measurement signal Str which may indicate when a contact portion 362A or 362B moves a given displacement or more (e.g., as corresponding to a contact with a workpiece). Note that a bridge circuit may be formed in the signal amplifying part, or a bridge circuit may be formed in the signal processing part. Additional operations of the signal processing portion 366, as well as the system controller portion 140 and host computer 150, will be described in more detail below.

As illustrated in FIG. 2, the supporting members 322 and 324 are elastically-deformable members disposed in the axial direction O of the probe housing 306 and allowing for orientation changes of the stylus 336. Specifically, the supporting member 324 has a rotationally symmetric shape including a total of four deformable arm parts 324B (e.g., four deformable arms) at positions displaced from each other by an angle of 90 degrees in a circumferential direction (around the axial center O) as illustrated in FIG. 3. These four arm parts 324B are formed on the same plane. The supporting members 322 and 324 have the same thickness and the same structure except for widths of the respective arm parts. Without being limited thereto, in various implementations the thicknesses, lengths, and shapes of the arm parts may be different from each other, or the entire supporting members 322 and 324 may have shapes different from each other. Thus, the supporting member 324 in which the detection elements 325 are disposed will be described below, and any overlapping description of the supporting member 322 will be omitted. Note that the shape of the supporting members is not limited to that shown in the present embodiment, and it is only necessary that at least one supporting member be provided.

As illustrated in FIG. 3, the supporting member 324 has a generally circular plate shape, and includes, in addition to the rectangular arm parts 324B, a central portion 324A to be connected to the coupling shaft 326, and a peripheral portion 324C that is coupled to the central portion 324A by the arm parts 324B and that is connected to the probe housing 306. The peripheral portion 324C is located at the outermost position of the supporting member 324. The arm parts 324B are disposed on an inner side of the peripheral portion 324C in such a manner as to extend linearly in a radial direction. The central portion 324A is disposed on an inner side of the arm parts 324B. The supporting member 324 is configured such that a displacement of the coupling shaft 326 with respect to the probe housing 306 causes the central portion 324A to move up, down, left, or right and thereby causes the arm parts 324B to be elastically deformed accordingly (e.g., as corresponding to a contact of the contact portion 362A or 362B with a workpiece, etc.)

The detection elements 325 are, for example, strain gauges to be affixed and detect a strain of the supporting member 324 in which the detection elements 325 are disposed as illustrated in FIG. 3. The four detection elements 325 are disposed at fourfold symmetry positions on the respective deformable arm parts 324B of the supporting member 324. The detection elements 325 are fixed to the arm parts 324B with an adhesive, for example. While a general-purpose strain gauge may be used, a temperature-compensated strain gauge may be used instead. Furthermore, from the standpoint of temperature compensation, temperature correction may be made by integrating a dummy strain gauge for temperature compensation into a bridge circuit (not illustrated), for example.

As illustrated in FIGS. 2 and 3, the coupling shaft 326 has a generally cylindrical shape, and couples the two supporting members 322 and 324 together. The coupling shaft 326 is held on the axial center O by the two supporting members 322 and 324 without being in contact with the lower flange 312, the fixing member 314, and the bottom member 316. The coupling shaft 326 integrally supports the flange member 328.

As illustrated in FIG. 2, the flange member 328 has a generally disc shape. The flange member 328 faces the bottom member 316 in the axial direction O in a non-contact manner and faces the main body cover 318 in the radial direction in a non-contact manner. The flange member 328 supports the stylus module 304. At least a portion of a gap between the bottom member 316 and the flange member 328 may be filled with a viscous material such as a grease oil. The permanent magnet 330 is fixed, on the axial center O, to a lower surface of the flange member 328. In a lower end outer region of the flange member 328, the three balls 332 (e.g., as part of a Maxwell kinematic coupling configuration) are disposed in a rotationally symmetric manner at an interval of 120 degrees in the circumferential direction so as to surround the permanent magnet 330.

The stylus module 304 includes the stylus motion mechanism 334 and a flange portion 338. In various implementations, the flange portion 338 may be integrally formed with or fixedly attached to an upper part of a casing CS (FIG. 4) of the stylus motion mechanism 334. As illustrated in FIG. 2, the flange portion 338 is a member corresponding to the flange member 328. That is, as part of a kinematic coupling configuration (e.g., a Maxwell kinematic coupling configuration), three V-shaped grooves 340 are disposed at an interval of 120 degrees in the circumferential direction of the flange portion 338 so as to be in contact with the three balls 332. A magnetic member 342, which may be a permanent magnet, to be attracted to the permanent magnet 330, is disposed in the flange portion 338 so as to face the permanent magnet 330.

Specifically, the flange portion 338 and the flange member 328 constitute a kinematic joint, which is a detachable coupling mechanism. In various implementations, the stylus module 304 may detach from the probe main body 302 if sufficient force is applied to the stylus module 304. For example, if an unintended collision occurs between the stylus module 304 or the stylus 336 and a workpiece W or other obstacle (e.g., as the measuring probe 300 is moved by the measuring machine 200), the resulting force may cause the stylus module 304 to detach from the probe main body 302 (e.g., with the detachment preventing damage to the probe main body 302 and/or stylus motion mechanism 304). In various implementations, different stylus modules 304 may be interchangeably utilized with the probe main body 302 (e.g., as may be interchanged utilizing the kinematic coupling configuration, with each stylus module 304 having a flange portion 338 with three V-shaped grooves 340 and a magnetic member 342 for the coupling).

As illustrated in FIG. 2, the stylus 336 is supported by the stylus motion mechanism 334 of the stylus module 304. In some implementations, the stylus motion mechanism 334 may also or alternatively be referenced as an over-travel mechanism 334. In various implementations, the stylus motion mechanism 334 may be configured to change the position of the stylus 336 when a corresponding force (e.g., a force greater than a measuring force applied for producing the measurement signal Str) is applied to the stylus 336, and to automatically restore the position of the stylus 336 when such a force disappears.

For example, in various implementations when a measuring machine 200 moves the measuring probe 300 to cause a contact portion 362A or 362B of the stylus 336 to initially contact a workpiece surface, the force of the contact may initially be relatively smaller (e.g., corresponding to a "measuring force" which produces the measurement signal Str). As the force increases past the measuring force (i.e., as may occur as the measuring machine 200 continues to move the contact portion 362A or 362B toward the workpiece surface after the initial contact, as part of a "continuation" of the movement and as may in some instances be referenced as an "over-travel" toward the workpiece surface), the stylus motion mechanism 334 accommodates the relatively larger force. More specifically, the stylus motion mechanism 334 enables movement of the stylus 336 (i.e., as corresponding to/resulting from the relatively larger force), without internal damage to the measuring probe. The stylus motion mechanism 334 then automatically restores the position of the stylus 336 (e.g., to a rest position) when the relatively larger force disappears (e.g., when the contact portion of the stylus is moved away from the workpiece). The structure and operation of the stylus motion mechanism 334 will be described in more detail below with respect to FIGS. 4-14.

As illustrated in FIG. 2, the stylus 336 includes: a rod portion 360 configured to extend in the axial direction O; the spherical contact portion 362A provided at the tip of the rod portion 360; and the spherical contact portion 362B provided at the end of an extended portion (e.g., extending at 90 degrees) from the rod portion 360. During operations, the contact portions 362A and 362B are configured to contact a workpiece W to be measured. For example, the contact portion 362A may be utilized to contact an upward facing workpiece surface (e.g., as the measuring probe 300 is moved downward by the measuring machine 200). As another example, the contact portion 362B may be utilized to contact a downward facing workpiece surface (e.g., as the measuring probe 300 is moved upward by the measuring machine 200). Such examples will be described in more detail below with respect to FIGS. 11 and 12.

In certain implementations, the signal processing portion 366 may include various portions. For example, as described in U.S. Pat. No. 10,852,119 (as previously incorporated herein), in various implementations the signal processing portion 366 may include a signal combination processing portion, a trigger threshold processing portion, an offset compensation portion, etc.

In various implementations, the signal processing portion 366 may be implemented according to principles known to one skilled in the art of touch probe design. Therefore, it is only briefly described here in one exemplary implementation. According to certain design principles, it may be desirable for the signal processing portion 366 to combine a plurality of displacement sensor signals (e.g., corresponding to Sa1 to Sa4) in order to provide a combined signal (e.g., that may be compared to a touch trigger signal switching threshold). Thus, the signal processing portion 366 inputs the four amplified signals Sa1 to Sa4 (e.g., which may be offset compensated signals in certain implementations), which may be converted to digital signals. The signal processing portion 366 may determine a combined displacement signal, which may be compared to a switching threshold value. When the combined displacement signal exceeds the switching threshold value, the signal processing portion 366 may output a measurement signal Str that indicates that the contact portion 362A or the contact portion 362B of the stylus 336 has contacted a workpiece surface (e.g., as corresponding to a touch signal).

The output of the measuring probe 300 (e.g., including the measurement signal Str) is provided to a system controller portion 140 (e.g., so that when a touch signal occurs, current measurement values may be recorded so as to indicate the present coordinates of the stylus and the measurement coordinates of a workpiece surface that it is contacting, such as in relation to an XYZ coordinate system of the measuring machine 200 or otherwise).

In various implementations, the system controller portion 140 may provide or otherwise indicate the coordinates of the measuring probe 300 as corresponding to when a touch signal is produced. For example, such coordinates may be in accordance with XYZ coordinates (e.g., in a machine coordinate system) as corresponding to the positioning of the measuring probe 300 by the X axis, Y axis, and Z axis movement mechanisms 222, 221, and 223 of the measuring machine 200. Such coordinates as corresponding to the position of the measuring probe 300 may be utilized to determine the measurement coordinates of a surface point on the workpiece that has been contacted by the contact portion 362A or the contact portion 362B (i.e., for which the contact resulted in the touch signal).

In various implementations, such measurement coordinates determinations may include factors such as the length of the stylus, etc. Such factors may also be related to whether the stylus has multiple contact portions (e.g., contact portions 362A and 362B) and a determination as to which contact portion contacted the workpiece (e.g., as may be determined at least in part based on the known movements of the measuring machine 200 in relation to the expected workpiece W characteristics and/or the known orientation of the stylus 336 as moved by the measuring machine 200, etc.). In various implementations, the contact portion 362A may be utilized for contacting an upward facing workpiece surface, for which the length of the stylus (e.g., the length of the rod portion 360) to the contact portion 362A may be a factor. The contact portion 362B may be utilized for contacting a downward facing workpiece surface, for which the length of the rod portion 360 to the extended portion including the contact portion 362B and the length of the extended portion (i.e., which extends at 90 degrees from the rod portion 360) that the contact portion 362B is at the end of may be factors. Such coordinate determinations which take such lengths etc. into account may be performed in accordance with known methods (e.g., which may in part rely on trigonometric and/or other principles, etc.).

A host computer 150 may receive and send signals from and to the system controller portion 140. In various implementations, the host computer 150 may be configured to operate and/or communicate with the measuring machine 200 via the system controller portion 140 and process measurement data (e.g., including coordinates) acquired by the measuring machine 200 to determine, for example, dimensions or a shape of a workpiece W being measured (e.g., based at least in part on touch signals received as the measuring probe 300 is moved to contact the workpiece W).

In various implementations, the signal processing portion 366 may include one or more processors 367P and a memory 367M, the system controller portion 140 may include one or more processors 141P and a memory 141M, and the host computer 150 may include one or more processors 151P and a memory 151M. In various implementations, for each respective portion, the respective memory may be coupled to the respective one or more processors, and may store program instructions that when executed by the one or more processors cause the one or more processors to perform certain functions and/or operations (e.g., such as those described herein).

Those skilled in the art will appreciate that certain portions or components thereof as described or usable with the elements and methods described herein may generally be implemented using any suitable computing system or device, including distributed or networked computing environments, and the like. Such computing systems or devices may include one or more general purpose or special purpose processors (e.g., non-custom or custom devices) that execute software to perform the functions described herein. Software may be stored in memory, such as random access memory (RAM), read only memory (ROM), flash memory, or the like, or a combination of such components. Software may also be stored in one or more storage devices, such as optical based disks, flash memory devices, or any other type of non-volatile storage medium for storing data. Software may include one or more program modules that include processes, routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

As will be described in more detail below with respect to FIGS. 4-14, the stylus motion mechanism 334 may be configured such that the stylus 336 is configured to be in a rest position RP (e.g., relative to a part of a casing CS, such as relative to a motion mechanism holding portion 346, or other reference portion of a stylus motion mechanism 334) when a sufficient corresponding force is not applied by a contact of a contact portion 362A or 362B of the stylus 336 with a workpiece W to move the stylus 336 from the rest position RP. In some implementations, the sufficient corresponding force may be greater than a measuring force required for outputting the measurement signal Str (e.g., a touch signal), such as described above with respect to FIGS. 2 and 3.

In various implementations, any reference point on the stylus 336 may be utilized for indicating the rest position (e.g., corresponding to a central geometric location of one of the contact portions 362, or of a center along the length of the stylus 336, or at a top portion of the stylus 336, etc.) Similarly, any reference point on any other component of the stylus motion mechanism 334 may be utilized for indicating a rest position of that component. For example, as illustrated in FIG. 2, a center point of the contact portion 362A is labeled as indicating a rest position RP (e.g., with coordinates XR, YR and ZR) of the stylus 336, and a central point of a stylus coupling portion SCP (i.e., where the stylus 336 is fixedly attached to the stylus motion mechanism 334) is labeled as indicating a rest position RPCP of the stylus coupling portion SCP.

In various implementations, coordinates of the rest position RP and/or RPCP may be in a measuring probe coordinate system and/or in a coordinate system that may be in relation to a reference position that corresponds to a part of a casing CS, such as relative to a motion mechanism holding portion 346, or other reference portion of the stylus motion mechanism 334. Correspondingly, movement of the stylus 336 and stylus coupling portion SCP from the rest positions RP and RPCP may indicate movement in relation to a reference position that corresponds to a part of a casing CS, such as relative to a motion mechanism holding portion 346, or other reference portion of the stylus motion mechanism 334.

Figure 4:
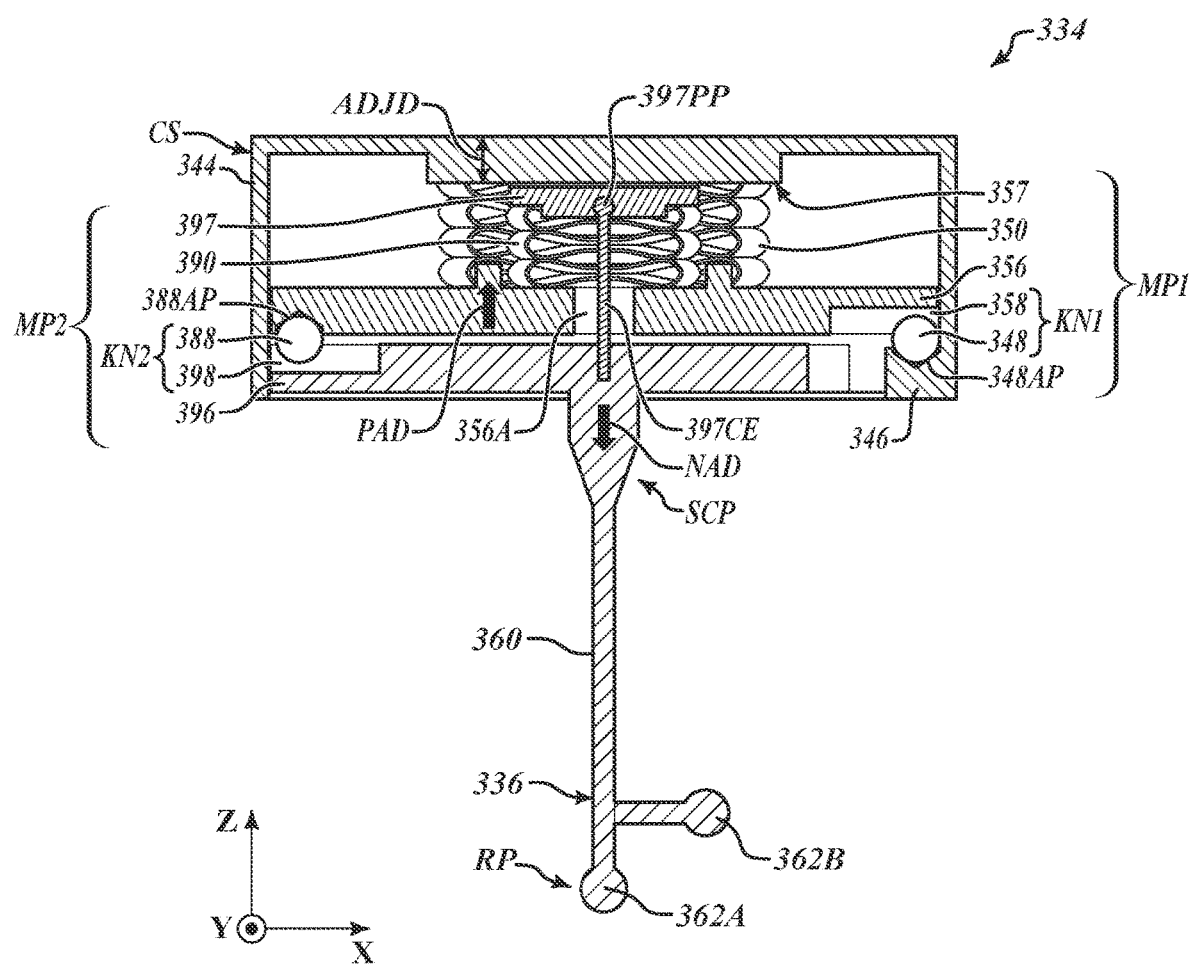
FIG. 4 is a diagram of a cross-sectional front view of a motion mechanism of the measuring probe of FIG. 2.
Figure 5:
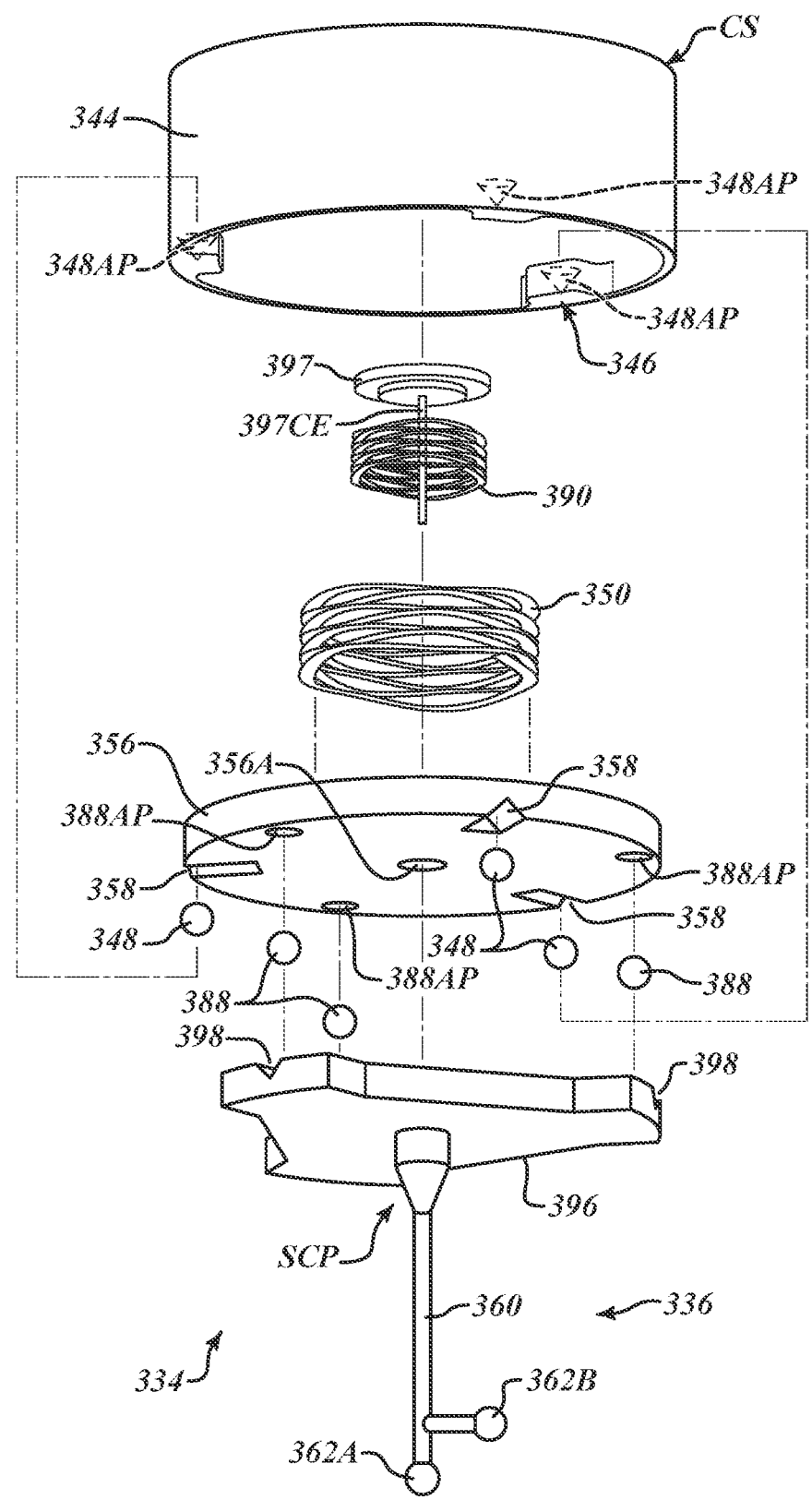
FIG. 5 is a diagram of an exploded isometric view of the motion mechanism of FIG. 4.

FIG. 4 is a diagram of a cross-sectional front view of the stylus motion mechanism 334 of the measuring probe of FIG. 2, and FIG. 5 is a diagram of an exploded isometric view of the stylus motion mechanism 334 of FIG. 4. As illustrated in FIGS. 4 and 5, the stylus motion mechanism 334 includes a first motion portion MP1 configured to enable motion of the stylus 336 from a rest position RP in a positive axial direction PAD when a corresponding force in the positive axial direction PAD is applied by a contact of a contact portion 362 of the stylus 336 with a workpiece W (see "FT1" in FIG. 11), wherein the positive axial direction PAD is toward a proximal end PE of the measuring probe 300 (see FIG. 2).

The stylus motion mechanism 334 also includes a second motion portion MP2 configured to enable motion of the stylus 336 from the rest position RP in a negative axial direction NAD when a corresponding force in the negative axial direction NAD is applied by a contact of a contact portion 362 of the stylus 336 with a workpiece W (see "FT2" in FIG. 12), wherein the negative axial direction NAD is opposite to the positive axial direction PAD.

In various implementations, the stylus 336 is configured to be in the rest position RP (e.g., relative to a part of the casing CS, such as relative to the motion mechanism holding portion 346, or other reference portion of the stylus motion mechanism 334) when a sufficient corresponding force is not applied by a contact of the contact portion 362 of the stylus 336 with a workpiece W to move the stylus 336 from the rest position RP. In some implementations, the sufficient corresponding force may be greater than a measuring force required for outputting the measurement signal Str (e.g., a touch signal), such as described above with respect to FIGS. 2 and 3.

In various implementations, the first motion portion MP1 is further configured to move the stylus 336 in the negative axial direction NAD to move the stylus 336 back to the rest position RP when the contact portion 362 of the stylus 336 is moved away from the workpiece W; and the second motion portion MP2 is further configured to move the stylus 336 in the positive axial direction PAD to move the stylus 336 back to the rest position RP when the contact portion 362 of the stylus 336 is moved away from the workpiece W.

For example, the first motion portion MP1 may comprise a first flexible element 350 (e.g., a first spring) which is configured to enable the movement in the positive axial direction PAD and which provides a force to move the stylus 336 back in the negative axial direction NAD toward the rest position RP. The second motion portion MP2 may comprise a second flexible element 390 (e.g., a second spring) which is configured to enable the movement in the negative axial direction NAD and which provides a force to move the stylus 336 back in the positive axial direction PAD toward the rest position RP. In exemplary implementations, the first flexible element 350 comprises a first spring, such as a first coil spring; and the second flexible element 390 comprises a second spring, such as a second coil spring.

In various implementations, the first flexible element 350 is configured to be compressed to enable the movement in the positive axial direction PAD; and the second flexible element 390 is configured to be compressed to enable the movement in the negative axial direction NAD. In exemplary implementations, movement from the rest position in the positive axial direction PAD which compresses the first flexible element 350 does not result in an application of force to the second flexible element 390; and movement from the rest position in the negative axial direction NAD which compresses the second flexible element 390 does not result in an application of force to the first flexible element 350.

In exemplary implementations as illustrated in FIGS. 4 and 5, the first motion portion MP1 may comprise a first base portion 356 and a first top element 357, wherein the first flexible element 350 is configured to be located between the first base portion 356 and the first top element 357, and the first base portion 356 is configured to move in the positive axial direction PAD and press against the first flexible element 350 to compress the first flexible element 350 between the first base portion 356 and the first top element 357. The second motion portion MP2 may comprise a second base portion 396 and a second top element 397 that is coupled to the second base portion 396, wherein the second top element 397 is configured to move in the negative axial direction NAD and press against the second flexible element 390 to compress the second flexible element 390. In the illustrated example, the second top element 397 is coupled to the second base portion 396 by a connecting element 397CE (e.g., a rod) and includes a pivot portion 397PP which is configured to enable the second top element 397 to pivot (e.g., to tilt) relative to the second base portion 396.

In various implementations, the bottom of the connecting element 397CE may also or alternatively include a pivot portion and/or otherwise have a flexible characteristic which enables the connecting element 397CE and/or second top element 397 to pivot relative to the second base portion 396. In various implementations, the connecting element 397CE (e.g., a rod) is configured to extend through a hole 356A in the first base portion 356. In various implementations, the distance between the second top element 397 and the second base portion 396 may be adjustable (e.g., for adjusting a preload or biasing force placed on the second flexible element 390, such as corresponding to an amount of compression of the second flexible element 390 when the stylus 336 has not moved in the negative axial direction NAD from the rest position RP). For example, such an adjustment may include adjusting the length of the connecting element 397CE between the second top element 397 and the second base portion 396. In various implementations, the connecting element 397CE may have a threaded portion, such as at the bottom for screwing into the second base portion 396, or at the top for screwing into the second top element 397, or in a middle for screwing a first part of the connecting element 397CE into a second part of the connecting element 397CE, in order for the distance between the second top element 397 and the second base portion 396 to be adjustable.

In various implementations, the distance between the first top element 357 and the first base portion 356 may similarly be adjustable (e.g., for adjusting a preload or biasing force placed on the first flexible element 350, such as corresponding to an amount of compression of the first flexible element 350 when the stylus 336 has not moved in the positive axial direction PAD from the rest position RP). For example, such an adjustment may include adjusting the axial position of the first top element 357 (e.g., as may be adjusted in an axial adjustment direction ADJD). In various implementations, the first top element 357 may have a threaded portion around the edges, such as for screwing into the casing CS, in order for the distance between the first top element 357 and the first base portion 356 to be adjustable. In various implementations, the first top element 357 may have a hole 357A (see FIG. 8) in the center that is of sufficient diameter to accommodate the second top element 397 (e.g., so that the second top element 397 may have freedom of upward motion and/or position such as within the hole 357A without being constrained by or otherwise pressing against the first top element 357).

In various implementations, the second base portion 396 is configured to move in the positive axial direction PAD and press against the first base portion 356 to cause the first base portion 356 to move in the positive axial direction PAD and press against the first flexible element 350 to compress the first flexible element 350. In various implementations, the second base portion 396 comprises a stylus coupling portion SCP which is configured to be rigidly coupled to the stylus 336. In various implementations, the stylus coupling portion SCP may include a hole with a securing element or other configuration capable of receiving and fixedly holding an upper end of the stylus 336, for which various types of stylus coupling configurations are known in the art.

In various implementations, as illustrated in FIG. 4, the first base portion 356 is coupled to the motion mechanism holding portion 346 as part of a first kinematic coupling configuration KN1; and the second base portion 396 is coupled to the first base portion 356 as part of a second kinematic coupling configuration KN2. In various implementations, the first motion portion MP1 comprises the first kinematic coupling configuration KN1; and the second motion portion MP2 comprises the second kinematic coupling configuration KN2.

As is known in the art, a kinematic coupling configuration is generally designed to exactly constrain two mating parts, providing precision and certainty of location. One type of kinematic coupling configuration is a Maxwell kinematic coupling configuration (e.g., as may be utilized for each of the first and second kinematic coupling configurations KN1 and KN2). As is known in the art, a Maxwell kinematic coupling configuration has three radial V-shaped grooves (oriented relative to a center of a part) in one part that mate with three curved surfaces (e.g., of balls, hemispheres, spherical portions, etc.) in another part. Each curved surface when mated with a V-shaped groove has two contact points for a total of six contact points, enough to constrain all six of the part's degrees of freedom. This design benefits from symmetry and therefore easier manufacturing techniques. Also the Maxwell coupling is thermally stable due to this symmetry as the curved surfaces can expand or contract in unison in the V-shaped grooves.

Figure 6:
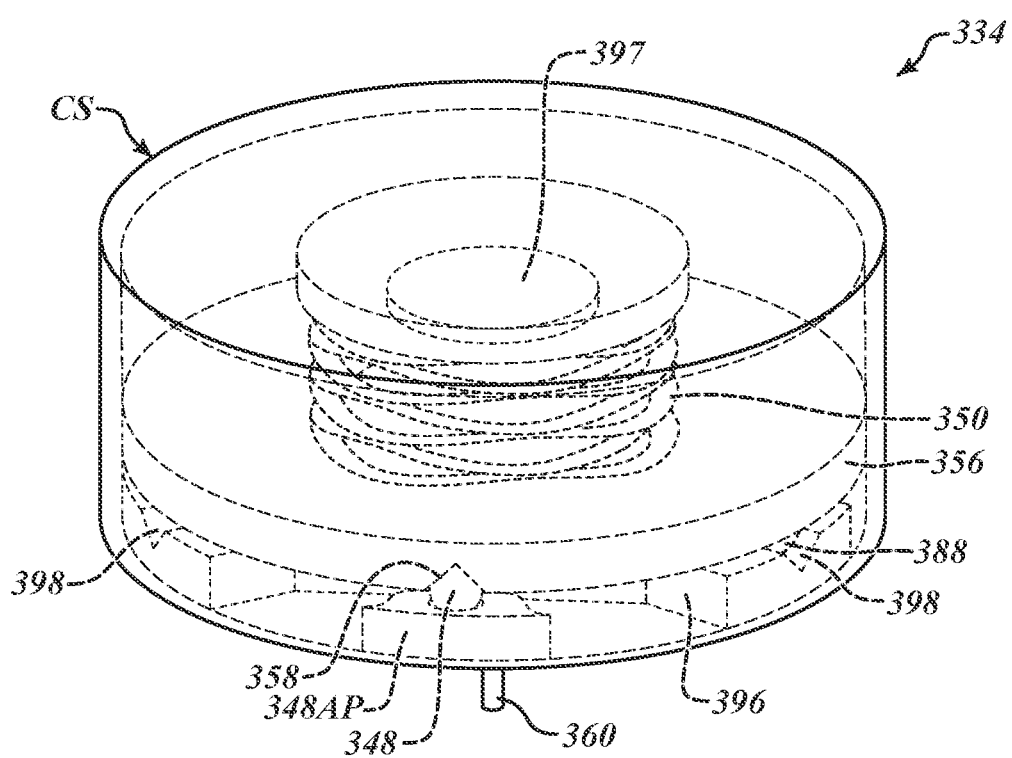
FIG. 6 is a diagram of a top isometric view of the motion mechanism of FIG. 4.
Figure 7:
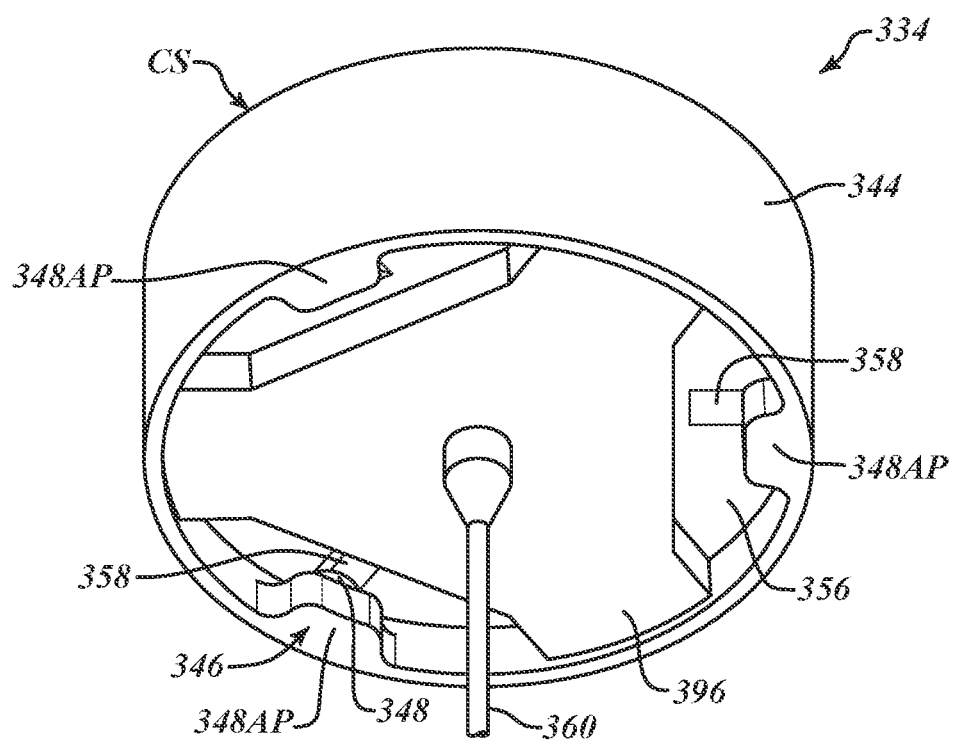
FIG. 7 is a diagram of a bottom isometric view of the motion mechanism of FIG. 4.
Figure 8:
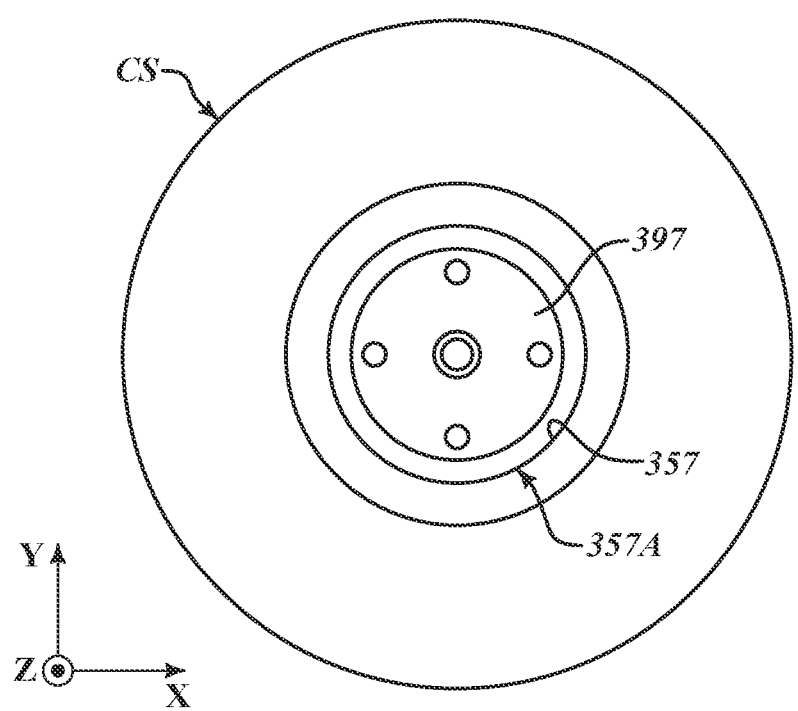
FIG. 8 is a diagram of a top view of the motion mechanism of FIG. 4.
Figure 9:
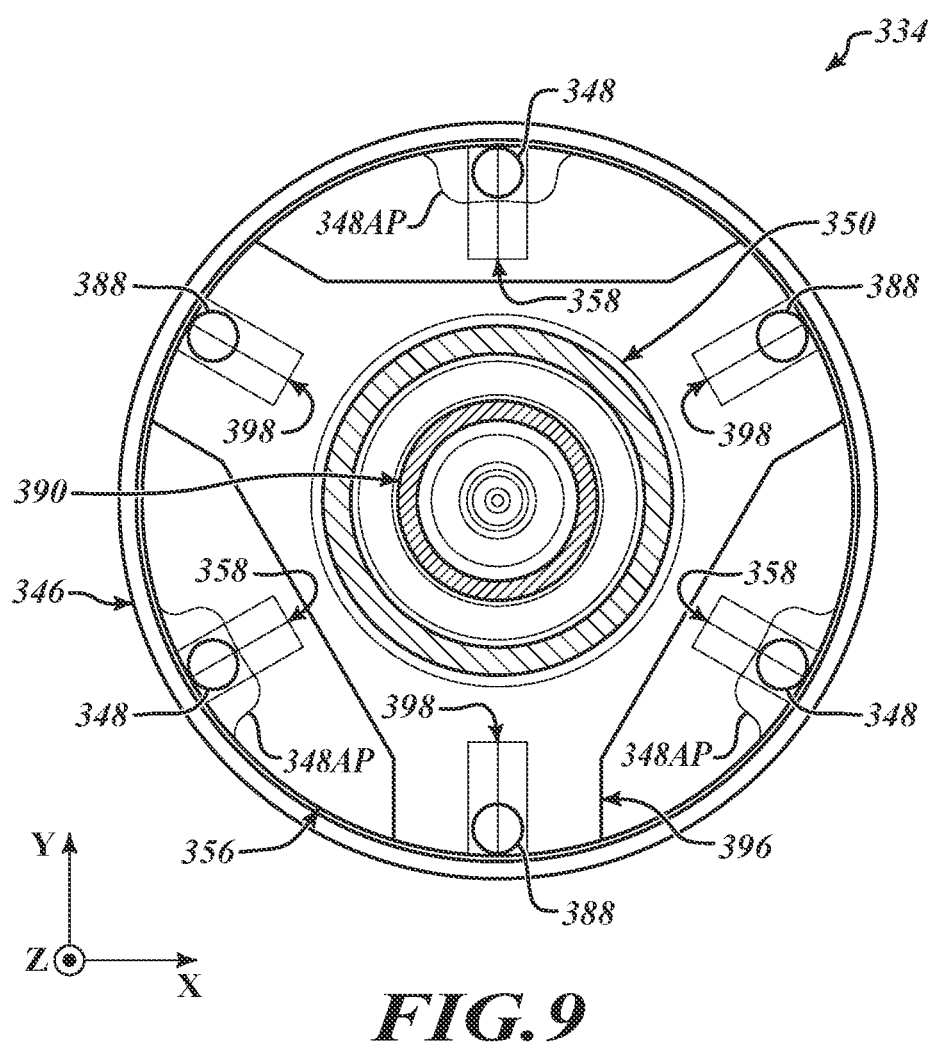
FIG. 9 is a diagram of a cross-sectional top view of the motion mechanism of FIG. 4.

Configuration of the stylus motion mechanism 334 including the first and second kinematic coupling configurations KN1 and KN2 will be more fully described in additional reference to FIGS. 6-12. FIG. 6 is a diagram of a top isometric view of the stylus motion mechanism 334 of FIG. 4. FIG. 7 is a diagram of a bottom isometric view of the stylus motion mechanism 334. FIG. 8 is a diagram of a top view of the stylus motion mechanism 334. FIG. 9 is a diagram of a cross-sectional top view of the stylus motion mechanism 334.

In various implementations, the first kinematic coupling configuration KN1 (e.g., a first Maxwell kinematic coupling configuration) comprises a first set of three radial V-shaped grooves 358 (see FIG. 5) disposed at an interval of 120 degrees in the circumferential direction in one part (e.g., in the first base portion 356) that mate with a first set of three curved surfaces 348 (e.g., surfaces of respective balls) disposed at an interval of 120 degrees in the circumferential direction in another part (e.g., in the motion mechanism holding portion 346 which includes the curved surfaces 348 of the balls that are fixedly attached in the attachment portions 348AP of the motion mechanism holding portion 346).

As also illustrated in FIG. 5, the casing CS includes an extended portion 344 (e.g., including a side of the casing) and the holding portion 346. In various implementations, the holding portion 346 is at the bottom of the casing CS and includes the attachment portions 348AP (e.g., also illustrated in FIGS. 6 and 7) where balls with curved surfaces 348 attach. When assembled, the V-shaped grooves 358 of the first base portion 356 rest on top of the curved surfaces 348 of the balls. As best illustrated in FIG. 5, the first base portion 356 includes attachment portions 388AP where balls with curved surfaces 388 attach. When assembled, the curved surfaces 388 of the balls rest in V-shaped grooves 398 of the second base portion 396, to form part of the second kinematic coupling configuration KN2.

Specifically, the second kinematic coupling configuration KN2 (e.g., a second Maxwell kinematic coupling configuration) may comprise a second set of three radial V-shaped grooves 398 disposed at an interval of 120 degrees in the circumferential direction in one part (e.g., in the second base portion 396) that mate with a second set of three curved surfaces 388 (e.g., surfaces of respective balls) disposed at an interval of 120 degrees in the circumferential direction in another part (e.g., in the first base portion 356 which includes the curved surfaces 388 of the balls that are fixedly attached in the attachment portions 388AP of the first base portion 356).

According to the exemplary configurations and assemblies described above, the first kinematic coupling configuration KN1 achieves high positioning reproducibility of the first base portion 356 (and thus the second base portion 396 and the stylus 336) with respect to the motion mechanism holding portion 346 (e.g., within the range of the measuring force in the positive axial direction PAD not exceeding the pressing force of the first flexible element 350). Similarly, the second kinematic coupling configuration KN2 achieves high positioning reproducibility of the second base portion 396 (and thus the stylus 336) with respect to the first base portion 356, and thus the motion mechanism holding portion 346 (e.g., within the range of the measuring force in the negative axial direction NAD not exceeding the pressing force of the second flexible element 390).

In various implementations, each V-shaped groove 398 of the second set of three radial V-shaped grooves 398 is oriented in an opposite axial direction as each V-shaped groove 358 of the first set of three radial V-shaped grooves 358. In the illustrated examples, each V-shaped groove 358 points in the positive axial direction PAD (e.g., as may be referenced as an upside down V), and each V-shaped groove 398 points in the negative axial direction NAD (e.g., as may be referenced as a right side up V), for which the V-shaped grooves 358 and 398 are thus oriented in opposite axial directions. In the illustrated implementations, the first and second kinematic coupling configurations KN1 and KN2 may lie in a common plane (e.g., the balls with the curved surfaces 348 and 396 may have geometric center points which all lie in a common plane, such as a common XY plane in the probe coordinate system). In various implementations, the second set of three radial V-shaped grooves 398 is offset by 60 degrees relative to the first set of three radial V-shaped grooves 358 in relation to a rotation around an axial center O of the measuring probe 300, as best shown in FIG. 9 (e.g., and as further described with respect to FIGS. 10A and 10B in relation to an angle A12).

In certain prior known systems, certain lobing type errors/issues may be present/occur in various measurement probes (e.g., touch probes) that utilize a single kinematic coupling configuration (e.g., a single Maxwell kinematic coupling configuration), due to the geometric setup of the contact points. Such issues may affect a type of sensing error depending on the X Y angle of approach for measurements made by the probe. More specifically, the three V-shaped groove/curved surfaces configuration (e.g., distributed at 120 degree intervals) may provide a stiffer resistance to movement depending on the angle of approach (e.g., with a greatest difference being between approaching a V-shaped groove, versus approaching a portion at a mid-point between two V-shaped grooves). In accordance with techniques as disclosed herein, the utilization of two Maxell kinematic coupling configurations that are offset from one another by 60 degrees (e.g., resulting in a configuration with a total of six V-shaped groove/curved surfaces with an overall distribution in 60 degree intervals) may achieve improved results (e.g., as may result in a more rounded hexagonal shape error as opposed to a typical triangular shape error resulting from certain prior systems/devices utilizing a single Maxwell kinematic coupling configuration with the three V-shaped groove/curved surfaces configuration). In certain implementations, the first and second flexible elements 350 and 390 may be configured to have approximately equal spring constants and preload forces (e.g., for achieving a relatively balanced configuration in relation to different potential angles of approach for measurements by the measuring probe).

Figure 11:
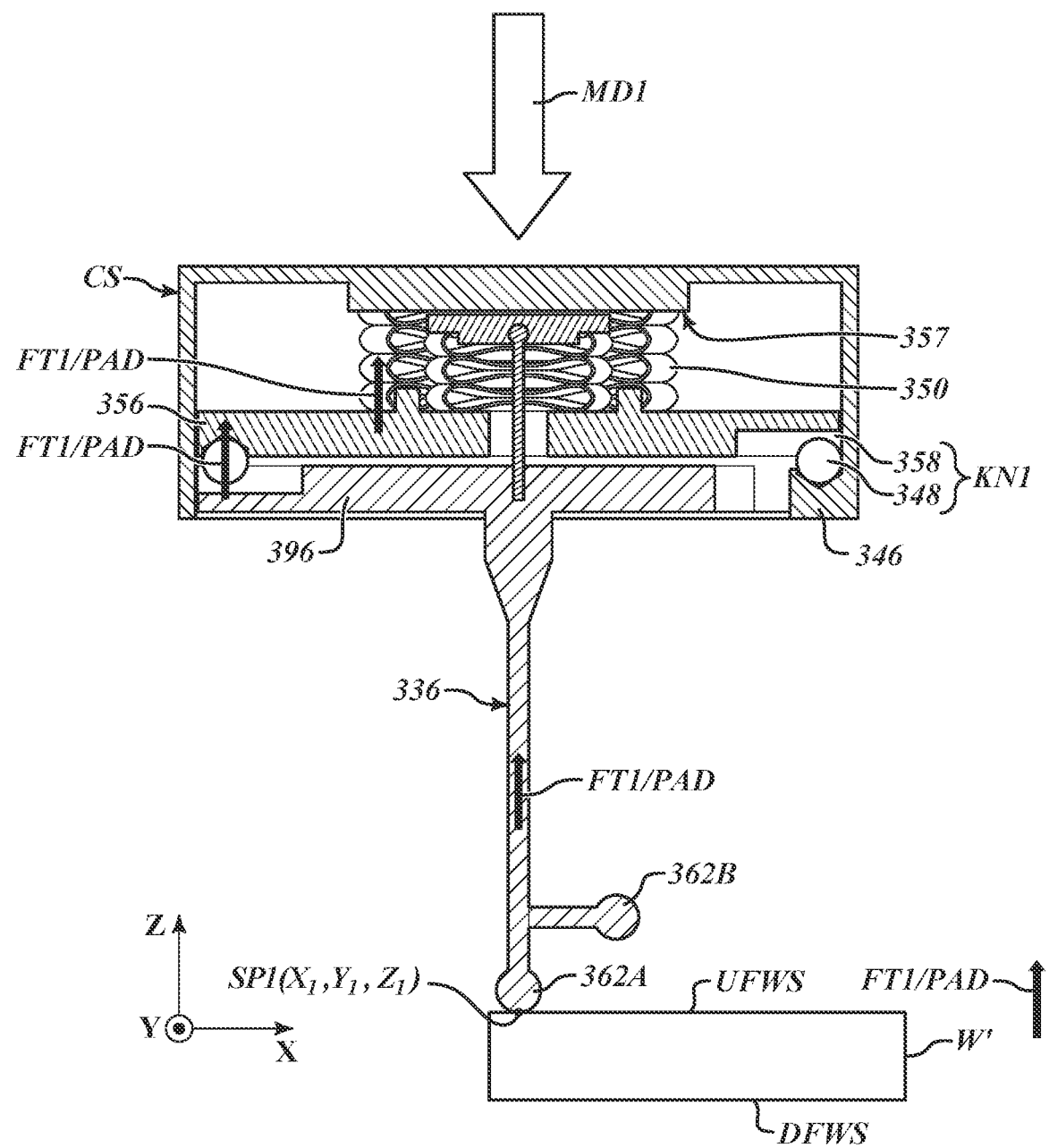
FIG. 11 is a diagram of the motion mechanism of FIG. 4 illustrating contact of a contact portion of a stylus with an upward facing workpiece surface.
Figure 12:
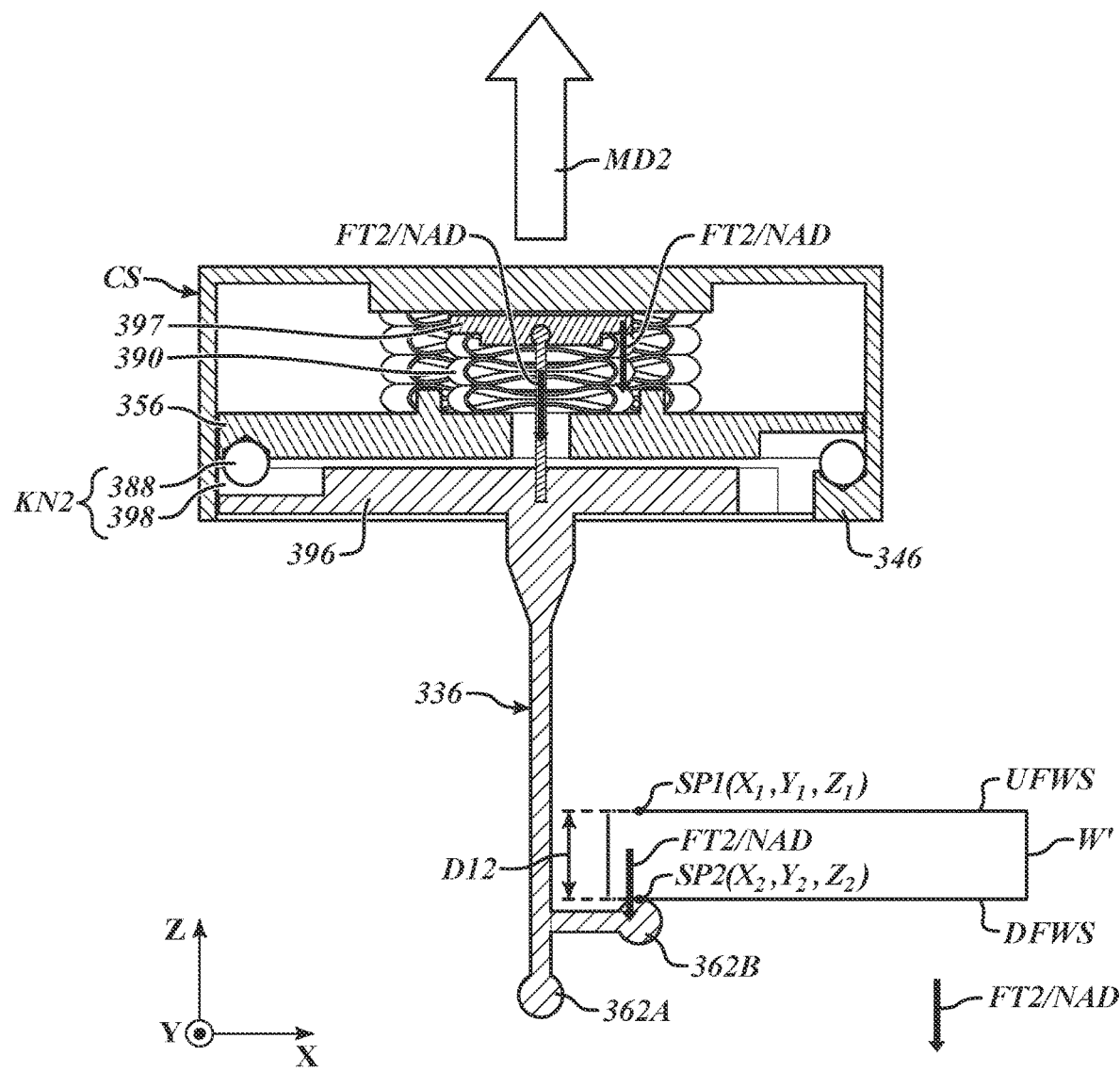
FIG. 12 is a diagram of the motion mechanism of FIG. 4 illustrating contact of a contact portion of a stylus with a downward facing workpiece surface.

In various implementations, as shown in FIG. 2, the one or more contact portions 362 of the stylus 336 comprise the first contact portion 362A (e.g., that may be configured to be used to contact upward facing workpiece surfaces UFWS, see FIG. 11) and a second contact portion 362B (e.g., that may be configured to be used to contact downward facing workpiece surfaces DFWS, see FIG. 12). In various implementations, the measuring probe 300 is configured to be coupled to a measuring machine 200 (e.g., such as a coordinate measuring machine (CMM), or a computer numerical control (CNC) machine with measurement capabilities, etc.) and oriented with an axial center O of the measuring probe 300 parallel to a z-axis of a machine coordinate system MCS of the measuring machine 200, as shown in FIG. 1. As will be described in more detail below with respect to FIG. 11, in various implementations, the measuring probe 300 is configured to be moved by the measuring machine 200 in a downward direction so as to cause the first contact portion 362A of the stylus 336 to contact an upward facing workpiece surface UFWS of a workpiece W, which results in a force in the positive axial direction PAD to the stylus 336, for which the first motion portion MP1 enables motion of the stylus 336 from the rest position RP in the positive axial direction PAD. As will be described in more detail below with respect to FIG. 12, in various implementations, the measuring probe 300 is configured to be moved by the measuring machine 200 in an upward direction so as to cause the second contact portion 362B of the stylus 336 to contact a downward facing workpiece surface DFWS of a workpiece W, which results in a force in the negative axial direction NAD to the stylus 336, for which the second motion portion MP2 enables motion of the stylus 336 from the rest position RP in the negative axial direction NAD.

In various implementations, the at least one detection element 325 (see FIGS. 2 and 3) is configured to sense the contact of the first contact portion 362A with the upward facing workpiece surface UFWS of the workpiece W and for which the signal processing portion 366 is configured to output a measurement signal that indicates the contact with the upward facing workpiece surface UFWS of the workpiece W. In addition, the at least one detection element 325 is configured to sense the contact of the second contact portion 362B with the downward facing workpiece surface DFWS of the workpiece W and for which the signal processing portion 366 is configured to output a measurement signal that indicates the contact with the downward facing workpiece surface DFWS of the workpiece W.

Figure 10A:
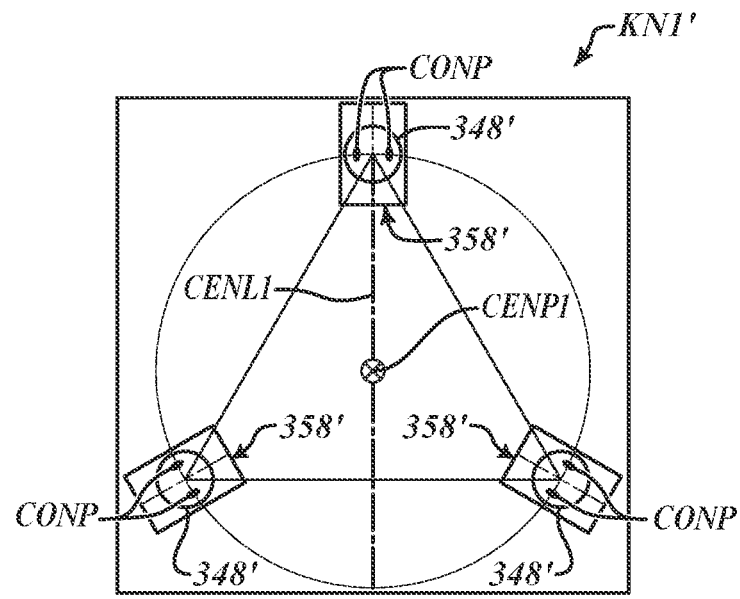
FIGS. 10A and 10B are cross-sectional top views of kinematic coupling configurations that are illustrative of the principles of the kinematic coupling configurations of the motion mechanism of FIG. 4.
Figure 10B:
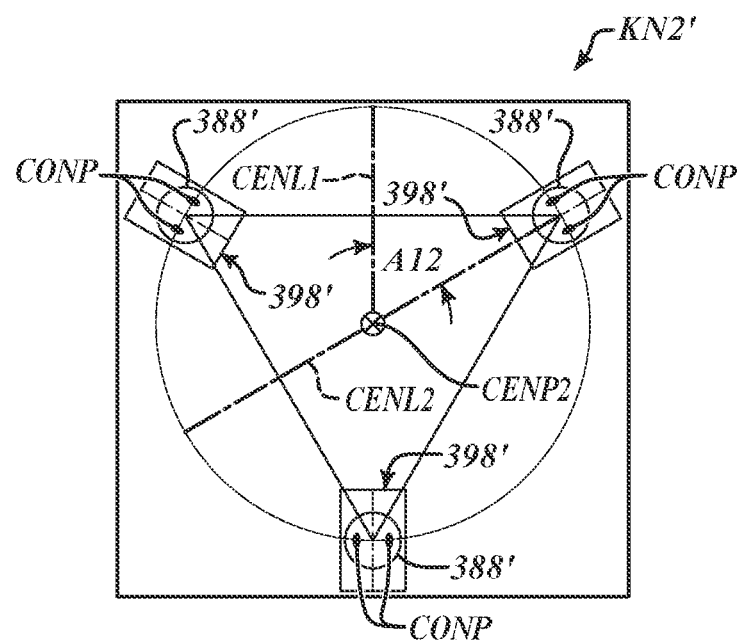

FIGS. 10A and 10B are cross-sectional top views of kinematic coupling configurations KN1' and KN2' that are illustrative of the principles of the kinematic coupling configurations KN1 and KN2 of the motion mechanism 334 of FIG. 4. In one aspect, the kinematic coupling configurations KN1 and KN2 as illustrated in FIG. 9 may be conceptually understood as a combination of the kinematic coupling configurations KN1' and KN2' of FIGS. 10A and 10B.

Specifically, FIG. 10A illustrates the first kinematic coupling configuration KN1' which is configured to decouple in a first decoupling direction to enable motion of the stylus 336 from the rest position RP in the positive axial direction PAD when a corresponding force is applied by a contact of the contact portion 362 (e.g., 362A) of the stylus 336 with a workpiece W, and which further enables high positioning reproducibility for the stylus 336 returning to the rest position RP corresponding to motion of the stylus 336 in the negative axial direction NAD to return to the rest position RP when the contact portion 362 is moved away from the workpiece W. The first kinematic coupling configuration KN1' includes three sets of V-shaped grooves 358' resting on curved surfaces 348', wherein each of the curved surfaces 348' may come in contact with the sides of the corresponding V-shaped groove 358' at two contact points CONP, at a total of six contact points CONP. As discussed above, six contact points CONP are enough to constrain six degrees of freedom of the stylus 336 in various implementations. A first center point CENP1 is defined as a central point of a triangle formed by the three sets of V-shaped grooves 358' and the curved surfaces 348', and a first center line CENL1 extends from one of the three points of the triangle through the first center point CENP1.

FIG. 10B illustrates the second kinematic coupling configuration KN2' which is configured to decouple in a second decoupling direction to enable motion of the stylus 336 from the rest position RP in the negative axial direction NAD when a corresponding force is applied by a contact of the contact portion 362 (e.g., 362B) of the stylus 336 with a workpiece W, and which further enables high positioning reproducibility for the stylus 336 returning to the rest position RP corresponding to motion of the stylus 336 in the positive axial direction PAD to return back to the rest position RP when the contact portion 362 is moved away from the workpiece W. The second kinematic coupling configuration KN2' includes three sets of V-shaped grooves 398' resting on curved surfaces 388', wherein each of the curved surfaces 388' may come in contact with the sides of the corresponding V-shaped groove 398' at two contact points CONP, at a total of six contact points CONP. As discussed above, six contact points CONP are enough to constrain six degrees of freedom of the stylus 336 in various implementations. A second center point CENP2 is defined as a central point of a triangle formed by the three sets of V-shaped grooves 398' and the curved surfaces 388', and a second center line CENL2 extends from one of the three points of the triangle through the second center point CENP2. In various implementations, an angle A12 formed by the first center line CENL1 and the second center line CENL2 may be 60 degrees, as illustrated in FIG. 10B.

FIG. 11 is a diagram of the motion mechanism 334 of FIG. 4 illustrating contact of the contact portion 362A of the stylus 336 with an upward facing workpiece surface UFWS. As illustrated in FIG. 11, in one example the probe 300 may be moved (e.g., by the measuring machine 200) in a first direction MD1 (e.g., in a downward motion direction) so as to cause a contact portion (e.g., contact portion 362A) of the stylus 336 to be pushed against an upward facing workpiece surface UFWS (e.g., with the contact occurring at a surface point SP1 on the upward facing workpiece surface UFWS). In the illustrated configuration, the contact causes/results in a force transfer FT1 in an upward direction, also referenced as a positive axial direction PAD. The initial contact (i.e., with a measuring force as described above with respect to FIGS. 2 and 3) causes the detection elements 325 to produce outputs which are processed by the signal processing circuit 320 to output a measurement signal Str (e.g., a touch signal), for which the $X_1$, $Y_1$, $Z_1$ coordinates (e.g., in the machine coordinate system) may be determined for the first surface point SP1.

The continued movement of the probe 300 in the downward first direction MD1 (e.g., for which in some instances the continued movement may be referenced as "over-travel" movement) results in the stylus 336 being pushed upward in the positive axial direction PAD from the rest position RP (e.g., that may be defined in relation to the holding portion 346 or other part of the casing CS or motion mechanism 334). As the stylus 336 moves (e.g., is pushed) upward (i.e., in the positive axial direction PAD) from the rest position RP, the first flexible element 350 (e.g., a first spring) is compressed (e.g., and the second flexible element 390 is not compressed). More specifically, when the stylus 336 moves upward, the second base portion 396 is pushed upward in the positive axial direction PAD which pushes the first base portion 356 upward (i.e., which rests on top of the second base portion 396 with the curved surfaces 388 of the balls resting in the V-shaped grooves 398 of the second base portion 396). Correspondingly, the first flexible element 350 (i.e., which rests on top of the first base portion 356) is compressed upward against the first top element 357 (i.e., as attached at the top of the case CS). The upward movement (i.e., in the positive axial direction PAD) causes the V-shaped grooves 358 to lift off of the curved surfaces 348 of the balls (i.e., as the first base portion 356 moves up away from the holding portion 346 at the bottom of the casing CS).

As the upward force from the force transfer FT1 is removed (e.g., as the probe 300 is moved, such as in an upward direction after the measurement of the surface point SP1 has been taken, so as to move the contact portion 362A away from the upward facing workpiece surface UFWS), the first flexible element 350 provides force to return the stylus 336 to the rest position RP (e.g., relative to the holding portion 346/casing CS). In various implementations, the first kinetic coupling configuration KN1 is configured to decouple in a first decoupling direction, which is in the positive axial direction PAD in the illustrated example. The first kinetic coupling configuration KN1 enables high positioning reproducibility for the stylus 336 returning to the rest position RP, with the V-shaped grooves 358 coming to rest in highly repeatable positions on the curved surfaces 348.

FIG. 12 is a diagram of the motion mechanism 334 of FIG. 4 illustrating contact of the contact portion 362B of the stylus 336 with a downward facing workpiece surface DFWS. As illustrated in FIG. 12, in another example the probe 300 may be moved (e.g., by the measuring machine 200) in a second direction MD2 (e.g., in an upward motion direction) so as to cause a contact portion (e.g., contact portion 362B) of the stylus 336 to be pulled (e.g., which in some instances may be referenced as being pushed) against a downward facing workpiece surface DFWS (e.g., with the contact occurring at a surface point SP2 on the downward facing workpiece surface DFWS). In the illustrated configuration, the contact causes/results in a force transfer FT2 in a downward direction, also referenced as a negative axial direction NAD. The initial contact (i.e., with a measuring force as described above with respect to FIGS. 2 and 3) causes the detection elements 325 to produce outputs which are processed by the signal processing circuit 320 to output a measurement signal Str (e.g., a touch signal), for which the $X_2$, $Y_2$, $Z_2$ coordinates (e.g., in the machine coordinate system) may be determined for the second surface point SP2.

The continued movement of the probe 300 in the upward second direction MD2 (e.g., for which in some instances the continued movement may be referenced as "over-travel" movement) results in the stylus 336 being pulled downward from the rest position RP (e.g., relative to the holding portion 346/casing CS). As the stylus 336 moves (e.g., is pulled) downward (i.e., in the negative axial direction NAD) from the rest position RP, the second flexible element 390 (e.g., a second spring) is compressed (i.e., and the first flexible element 350 is not compressed). More specifically, when the stylus 336 moves downward, the attached second top element 397 is pulled downward in the negative axial direction NAD. Correspondingly, the second flexible element 390 (i.e., which is located beneath the second top element 397) is compressed downward against the first base portion 356. The first base portion 356 does not move relative to the holding portion 346/casing CS due to the V-shaped grooves 358 of the first base portion 356 resting on top of the curved surfaces 348 of the balls of the holding portion 346 of the casing CS (see FIG. 11). In FIG. 12, the downward motion causes the second base portion 396 to pull away from the first base portion 356, with the V-shaped grooves 398 of the second base portion 396 pulling away from the curved surfaces 388 of the balls.

As the downward force from the force transfer FT2 is removed (e.g., as the probe 300 is moved, such as in a downward direction after the measurement of the surface point SP2 has been taken, so as to move the contact portion 362B away from the downward facing workpiece surface DFWS), the second flexible element 390 provides force to return the stylus 336 to the rest position RP (e.g., relative to the holding portion 346/casing CS). In various implementations, the second kinetic coupling configuration KN2 is configured to decouple in a second decoupling direction, which is in the negative axial direction NAD and is opposite to the first decoupling direction of the first kinetic coupling configuration KN1 of FIG. 11 in the illustrated example. The second kinetic coupling configuration KN2 enables high positioning reproducibility for the stylus 336 returning to the rest position RP, with the curved surfaces 388 coming to rest in highly repeatable positions in the V-shaped grooves 398.

As illustrated by the processes of FIGS. 11 and 12, the stylus motion mechanism 334 enables movement of the measuring probe 300 (e.g., by a measuring machine 200) for contacting a workpiece W' (e.g., with a possibility of relatively longer over-travel distances) without internal damage to the measuring probe 300, and in regard to motion of the stylus 336 in both positive and negative axial directions. It will also be appreciated that the determinations of coordinates of surface points (e.g., such as surface points SP1 and SP2) may enable certain dimensions and/or shape characteristics of the workpiece W' to be determined. For example, in the illustrated configuration of FIG. 12 a dimension D12 of the workpiece W' may be determined in accordance with a distance between the surface points SP1 and SP2 (in this example corresponding to a difference between the Z coordinates, for which $D12=Z_1-Z_2$). It is noted that in the illustrated configuration, such processes (e.g., for measuring both upward and downward facing workpiece surfaces) may be performed while the axial center O of the measuring probe 300 remains aligned with the Z-axis of the machine coordinate system (e.g., the measuring probe 300 does not need to be rotated or otherwise re-oriented for measuring both upward and downward facing workpiece surfaces).

Figure 13:
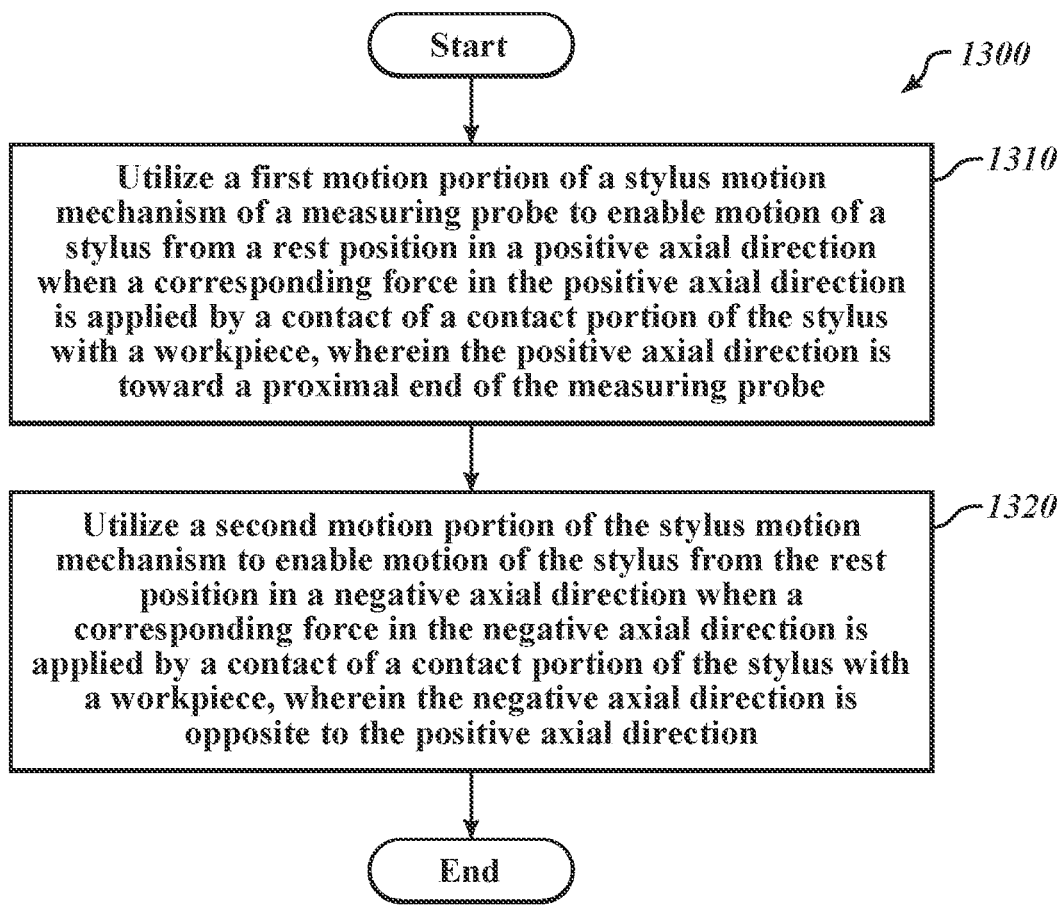
FIG. 13 is a flow diagram illustrating an exemplary implementation of a method for operating a measuring system including a measuring probe.

FIG. 13 is a flow diagram illustrating an exemplary implementation of a method 1300 for operating a measuring system 100 including a measuring probe 300. At a block 1310, a first motion portion MP1 of a stylus motion mechanism 334 of a measuring probe 300 is utilized to enable motion of a stylus 336 from a rest position RP in a positive axial direction PAD when a corresponding force in the positive axial direction is applied by a contact of a contact portion 362 of the stylus with a workpiece, wherein the positive axial direction PAD is toward a proximal end PE of the measuring probe. At a block 1320, a second motion portion MP2 of the stylus motion mechanism 334 is utilized to enable motion of the stylus 336 from the rest position RP in a negative axial direction NAD when a corresponding force in the negative axial direction is applied by a contact of a contact portion 362 of the stylus with a workpiece, wherein the negative axial direction NAD is opposite to the positive axial direction.

Figure 14:
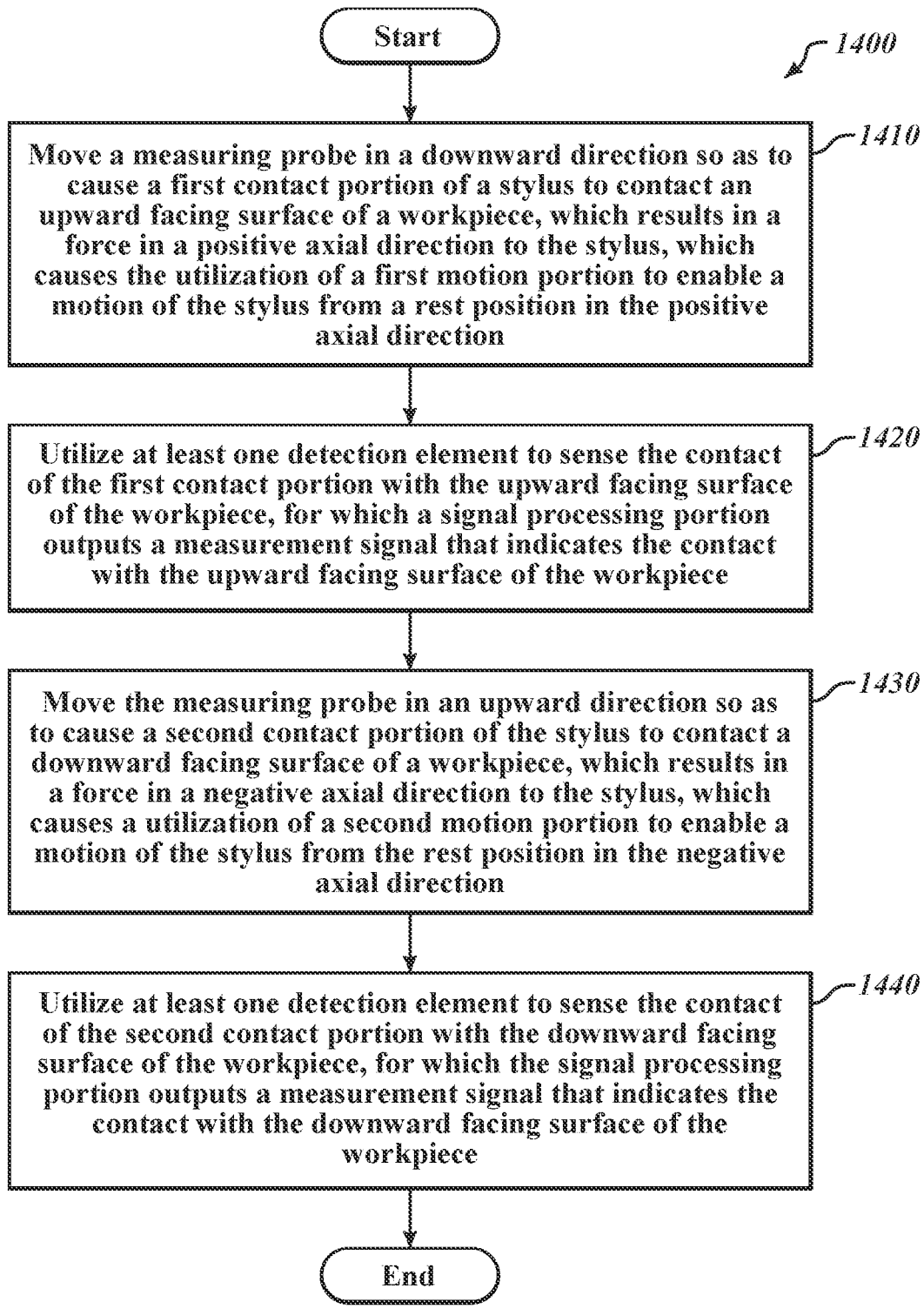
FIG. 14 is a flow diagram illustrating an exemplary implementation of a method for operating a measuring system for moving a measuring probe for measuring upward and downward facing workpiece surfaces.

FIG. 14 is a flow diagram illustrating an exemplary implementation of a method 1400 for operating a measuring system 100 for moving a measuring probe 300 for measuring upward and downward facing workpiece surfaces. At a block 1410, a measuring probe 300 is moved in a downward direction so as to cause a first contact portion (e.g. 362A) of a stylus 336 to contact an upward facing surface of a workpiece UFWS, which results in a force in a positive axial direction PAD to the stylus 336, which causes the utilization of a first motion portion MP1 to enable a motion of the stylus 336 from a rest position RP in the positive axial direction. At a block 1420, at least one detection element 325 is utilized to sense the contact of the first contact portion with the upward facing surface of the workpiece UFWS, for which a signal processing portion 366 outputs a measurement signal that indicates the contact with the upward facing surface of the workpiece.

At a block 1430, the measuring probe 300 is moved in an upward direction so as to cause a second contact portion (e.g., 362B) of the stylus 336 to contact a downward facing surface of a workpiece DFWS, which results in a force in a negative axial direction NAD to the stylus 336, which causes a utilization of a second motion portion MP2 to enable a motion of the stylus 336 from the rest position RP in the negative axial direction. At a block 1440, at least one detection element 325 is utilized to sense the contact of the second contact portion with the downward facing surface of the workpiece DFWS, for which the signal processing portion 366 outputs a measurement signal that indicates the contact with the downward facing surface of the workpiece.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A measuring system, comprising:
a measuring probe comprising:
a stylus having one or more contact portions that are configured to contact a workpiece to be measured;
at least one detection element configured to detect a movement of the stylus as corresponding to a contact of a contact portion of the stylus with a workpiece;
a signal processing portion configured to process a generated signal obtained from an output of the at least one detection element to output a measurement signal; and
a stylus motion mechanism, comprising:
a first motion portion configured to enable motion of the stylus from a rest position in a positive axial direction when a corresponding force in the positive axial direction is applied by a contact of a contact portion of the stylus with a workpiece, wherein the positive axial direction is toward a proximal end of the measuring probe; and
a second motion portion configured to enable motion of the stylus from the rest position in a negative axial direction when a corresponding force in the negative axial direction is applied by a contact of a contact portion of the stylus with a workpiece, wherein the negative axial direction is opposite to the positive axial direction.

2. The measuring system of claim 1, wherein:
the first motion portion is further configured to move the stylus in the negative axial direction to move the stylus back to the rest position when the contact portion of the stylus is moved away from the workpiece; and
the second motion portion is further configured to move the stylus in the positive axial direction to move the stylus back to the rest position when the contact portion of the stylus is moved away from the workpiece.

3. The measuring system of claim 2, wherein:
the first motion portion comprises a first flexible element which is configured to enable the movement in the positive axial direction and which provides a force to move the stylus back in the negative axial direction toward the rest position; and the second motion portion comprises a second flexible element which is configured to enable the movement in the negative axial direction and which provides a force to move the stylus back in the positive axial direction toward the rest position.

4. The measuring system of claim 3, wherein:
the first flexible element is configured to be compressed to enable the movement in the positive axial direction; and
the second flexible element is configured to be compressed to enable the movement in the negative axial direction.

5. The measuring system of claim 4, wherein:
movement from the rest position in the positive axial direction which compresses the first flexible element does not result in an application of force to the second flexible element; and
movement from the rest position in the negative axial direction which compresses the second flexible element does not result in an application of force to the first flexible element.

6. The measuring system of claim 4, wherein:
the first motion portion comprises a first base portion and a first top element, wherein the first flexible element is configured to be located between the first base portion and the first top element, and the first base portion is configured to move in the positive axial direction and press against the first flexible element to compress the first flexible element between the first base portion and the first top element; and
the second motion portion comprises a second base portion and a second top element that is coupled to the second base portion, wherein the second top element is configured to move in the negative axial direction and press against the second flexible element to compress the second flexible element.

7. The measuring system of claim 6, wherein the second top element is coupled to the second base portion by a connecting element and includes a pivot portion which is configured to enable the second top element to pivot relative to the second base portion.

8. The measuring system of claim 6, wherein the second base portion is configured to move in the positive axial direction and press against the first base portion to cause the first base portion to move in the positive axial direction and press against the first flexible element to compress the first flexible element.

9. The measuring system of claim 8, wherein:
the measuring probe further comprises a motion mechanism holding portion;
the first base portion is coupled to the motion mechanism holding portion as part of a first kinematic coupling configuration; and
the second base portion is coupled to the first base portion as part of a second kinematic coupling configuration.

10. The measuring system of claim 8, wherein the second base portion comprises a stylus coupling portion which is configured to be rigidly coupled to the stylus.

11. The measuring system of claim 4, wherein:
the first flexible element comprises a first spring; and
the second flexible element comprises a second spring.

12. The measuring system of claim 1, wherein:
the first motion portion comprises a first kinematic coupling configuration; and
the second motion portion comprises a second kinematic coupling configuration.

13. The measuring system of claim 12, wherein the second kinematic coupling configuration is oriented in an opposite axial direction as the first kinematic coupling configuration.

14. The measuring system of claim 12, wherein:
the first kinematic coupling configuration is configured to decouple in a first decoupling direction; and
the second kinematic coupling configuration is configured to decouple in a second decoupling direction that is opposite to the first decoupling direction.

15. The measuring system of claim 14, wherein the first decoupling direction is in the positive axial direction and the second decoupling direction is in the negative axial direction.

16. The measuring system of claim 12, wherein:
the first kinematic coupling configuration comprises a first set of three radial V-shaped grooves in one part that mate with a first set of three curved surfaces in another part;
the second kinematic coupling configuration comprises a second set of three radial V-shaped grooves in one part that mate with a second set of three curved surfaces in another part; and
each V-shaped groove of the second set of three radial V-shaped grooves is oriented in an opposite axial direction as each V-shaped groove of the first set of three radial V-shaped grooves.

17. The measuring system of claim 16, wherein the second set of three radial V-shaped grooves is offset by 60 degrees relative to the first set of three radial V-shaped grooves in relation to a rotation around an axial center of the measuring probe.

18. The measuring system of claim 1, wherein the one or more contact portions of the stylus comprise a first contact portion that is configured to be used to contact upward facing workpiece surfaces and a second contact portion that is configured to be used to contact downward facing workpiece surfaces.

19. The measuring system of claim 1, wherein:
the measuring probe is configured to be coupled to a measuring machine and oriented with an axial center of the measuring probe parallel to a z-axis of a machine coordinate system of the measuring machine;
the measuring probe is configured to be moved by the measuring machine in a downward direction so as to cause a first contact portion of the stylus to contact an upward facing surface of a workpiece, which results in a force in the positive axial direction to the stylus, for which the first motion portion enables motion of the stylus from the rest position in the positive axial direction; and
the measuring probe is configured to be moved by the measuring machine in an upward direction so as to cause a second contact portion of the stylus to contact a downward facing surface of a workpiece, which results in a force in the negative axial direction to the stylus, for which the second motion portion enables motion of the stylus from the rest position in the negative axial direction.

20. The measuring system of claim 19, wherein:
the at least one detection element is configured to sense the contact of the first contact portion with the upward facing surface of the workpiece and for which the signal processing portion is configured to output a measurement signal that indicates the contact with the upward facing surface of the workpiece; and the at least one detection element is configured to sense the contact of the second contact portion with the downward facing surface of the workpiece and for which the signal processing portion is configured to output a measurement signal that indicates the contact with the downward facing surface of the workpiece.

21. A method for operating a measuring system including a measuring probe, the measuring probe comprising:
- a stylus having one or more contact portions that are configured to contact a workpiece to be measured;
- at least one detection element configured to detect a movement of the stylus as corresponding to a contact of a contact portion of the stylus with a workpiece;
- a signal processing portion configured to process a generated signal obtained from an output of the at least one detection element to output a measurement signal; and
- a stylus motion mechanism configured to enable motion of the stylus, the stylus motion mechanism comprising a first motion portion and a second motion portion;

the method comprising:
- utilizing the first motion portion to enable motion of the stylus from a rest position in a positive axial direction when a corresponding force in the positive axial direction is applied by a contact of a contact portion of the stylus with a workpiece, wherein the positive axial direction is toward a proximal end of the measuring probe; and
- utilizing the second motion portion to enable motion of the stylus from the rest position in a negative axial direction when a corresponding force in the negative axial direction is applied by a contact of a contact portion of the stylus with a workpiece, wherein the negative axial direction is opposite to the positive axial direction.

22. The method of claim 21, further comprising:
moving the measuring probe in a downward direction so as to cause a first contact portion of the stylus to contact an upward facing surface of a workpiece, which results in a force in the positive axial direction to the stylus, which causes the utilization of the first motion portion to enable the motion of the stylus from the rest position in the positive axial direction; and
moving the measuring probe in an upward direction so as to cause a second contact portion of the stylus to contact a downward facing surface of a workpiece, which results in a force in the negative axial direction to the stylus, which causes the utilization of the second motion portion to enable the motion of the stylus from the rest position in the negative axial direction.

23. The method of claim 22, further comprising:
utilizing the at least one detection element to sense the contact of the first contact portion with the upward facing surface of the workpiece, for which the signal processing portion outputs a measurement signal that indicates the contact with the upward facing surface of the workpiece; and
utilizing the at least one detection element to sense the contact of the second contact portion with the downward facing surface of the workpiece, for which the signal processing portion outputs a measurement signal that indicates the contact with the downward facing surface of the workpiece.

24. A stylus motion mechanism for utilization in a measuring probe, the measuring probe comprising:
- a stylus having one or more contact portions that are configured to contact a workpiece to be measured;
- at least one detection element configured to detect a movement of the stylus as corresponding to a contact of a contact portion of the stylus with a workpiece; and
- a signal processing portion configured to process a generated signal obtained from an output of the at least one detection element to output a measurement signal;

the stylus motion mechanism, comprising:
- a stylus coupling portion that is configured to be rigidly coupled to the stylus;
- a first motion portion configured to enable motion of the stylus coupling portion from a rest position in a positive axial direction when a corresponding force in the positive axial direction is applied by a contact of a contact portion of the stylus with a workpiece, wherein the positive axial direction is toward a proximal end of the measuring probe; and
- a second motion portion configured to enable motion of the stylus coupling portion from the rest position in a negative axial direction when a corresponding force in the negative axial direction is applied by a contact of a contact portion of the stylus with a workpiece, wherein the negative axial direction is opposite to the positive axial direction.

25. The stylus motion mechanism of claim 24, wherein:
the first motion portion comprises a first kinematic coupling configuration comprising a first set of three radial V-shaped grooves in one part that mate with a first set of three curved surfaces in another part;
the second motion portion comprises a second kinematic coupling configuration comprising a second set of three radial V-shaped grooves in one part that mate with a second set of three curved surfaces in another part; and
each V-shaped groove of the second set of three radial V-shaped grooves is oriented in an opposite axial direction as each V-shaped groove of the first set of three radial V-shaped grooves.

* * * * *